(12) United States Patent
Takeuchi et al.

(10) Patent No.: US 8,204,665 B2
(45) Date of Patent: Jun. 19, 2012

(54) VEHICLE CONTROLLER, CONTROL METHOD, AND COMPUTER PROGRAM

(75) Inventors: Atsushi Takeuchi, Okazaki (JP); Takayuki Miyajima, Okazaki (JP); Yoshito Kondou, Okazaki (JP)

(73) Assignee: Aisin AW Co., Ltd. (JP)

( * ) Notice: Subject to any disclaimer, the term of this patent is extended or adjusted under 35 U.S.C. 154(b) by 711 days.

(21) Appl. No.: 12/289,642

(22) Filed: Oct. 31, 2008

(65) Prior Publication Data

US 2009/0132139 A1 May 21, 2009

(30) Foreign Application Priority Data

Nov. 21, 2007 (JP) ................... 2007-301192

(51) Int. Cl.
*G06F 7/00* (2006.01)
(52) U.S. Cl. ....................................................... 701/70
(58) Field of Classification Search .................. 701/70, 701/72, 79; 700/186–188; 340/425.5, 435–438
See application file for complete search history.

(56) References Cited

U.S. PATENT DOCUMENTS

| | | | |
|---|---|---|---|
| 5,189,621 A | 2/1993 | Onari et al. | 364/431.04 |
| 5,521,823 A | 5/1996 | Akita | 364/424.05 |
| 6,076,034 A | 6/2000 | Satoh et al. | 701/70 |
| 6,324,462 B1 * | 11/2001 | Kageyama | 701/93 |
| 2002/0035422 A1 * | 3/2002 | Sasaki | 701/35 |
| 2007/0100532 A1 | 5/2007 | Miyajima et al. | 701/95 |
| 2008/0294321 A1 * | 11/2008 | Yamakado et al. | 701/93 |
| 2009/0132139 A1 * | 5/2009 | Takeuchi et al. | 701/70 |

FOREIGN PATENT DOCUMENTS

| | | |
|---|---|---|
| JP | 11-020511 | 1/1999 |
| JP | 11-229917 | 8/1999 |
| JP | 2003-252188 | 9/2003 |
| JP | 2004-014099 | 1/2004 |
| JP | 2006-103462 | 4/2006 |
| JP | 2006-347531 | 12/2006 |
| JP | 2007-126129 | 5/2007 |

* cited by examiner

*Primary Examiner* — Yonel Beaulieu
(74) *Attorney, Agent, or Firm* — Bacon & Thomas, PLLC

(57) ABSTRACT

A deceleration start point where a driver performs a deceleration operation of a vehicle before entering a curve when the vehicle is to travel on a curve is identified from a vehicle operation history in the past, and an acceleration start point where the driver performs an acceleration operation of the vehicle when exiting a curve is identified from the vehicle operation history in the past. While these items are comprehended as driving tendencies of the driver, deceleration control and acceleration limit control to a target limiting vehicle speed are performed when the vehicle reaches the deceleration start point. Thereafter, when the vehicle reaches the acceleration start point, acceleration permission control to release the acceleration limit is performed.

12 Claims, 18 Drawing Sheets

FIG. 18

TARGET LIMIT VEHICLE SPEED = $\sqrt{\text{CURVE R} \times \text{LATERAL ACCELERATION}}$ (1) WHEN LATERAL ACCELERATION IS SET
    LATERAL ACCELERATION = SET VALUE (2) WHEN LATERAL ACCELERATION IS NOT SET
    LATERAL ACCELERATION = 0.20 G

VEHICLE CONTROLLER, CONTROL METHOD, AND COMPUTER PROGRAM

INCORPORATION BY REFERENCE

The disclosure of Japanese Patent Application No. 2007-301192 filed on Nov. 21, 2007 including the specification, drawings and abstract is incorporated herein by reference in its entirety.

BACKGROUND OF THE INVENTION

1. Field of the Invention

The present invention relates to a vehicle control system, a vehicle control method and a computer program for performing vehicle control when traveling on a curve.

2. Description of the Related Art

Conventionally, there is proposed a vehicle control system which obtains road information, which can be obtained from map data of a navigation device, or various information related to traveling of a vehicle such as a current position identified by a global positioning system (GPS) or the like, and prevents a vehicle accident by informing the driver, assisting in driving, and moreover intervening in driving. Such a vehicle control system performs vehicle control with various conditions and timings. When traveling on a curve in particular, it is performed to decelerate the vehicle to an appropriate speed when entering the curve.

For example, in Japanese Patent Application Publication No. JP-A 2007-126129 (pp. 6 to 10, FIG. 5, FIG. 6), there is described a vehicle control system which obtains the shape of a curve ahead of the vehicle, sets a target speed when entering the curve from the obtained shape of the curve, and performs control to decelerate the vehicle before traveling on the curve to allow traveling at the set target speed or lower.

SUMMARY OF THE INVENTION

Here, in the vehicle control system described in Japanese Patent Application Publication No. JP-A 2007-126129, the target speed for identifying a control content is determined only based on a curve shape. Specifically, driving tendencies of the driver driving the vehicle is not considered, and the control is performed with the same control content uniformly for each driver under the same condition (for example, a state of approaching a curve with the same radius of curvature and the same length).

However, since tendencies of driving a vehicle of each driver vary, it is not always the case that the control content is appropriate for all the users.

The present invention is made in view of solving the above-described problems in the past, and an object thereof is to provide a vehicle control system, a vehicle control method and a computer program which are capable of comprehending driving tendencies from a vehicle operation history in the past of a driver, and performing control of a vehicle on which driving tendencies of the driver are reflected on a control content.

According to a vehicle control system of a first aspect of the present invention, it becomes possible to comprehend driving tendencies from a vehicle operation history of a driver in the past, and perform appropriate control of the vehicle in which driving tendencies of the driver are reflected on the control content. Particularly, when exiting a curve, permission control of acceleration of the vehicle can be performed at timing when the driver performs an acceleration operation, thereby allowing the driver to drive without getting stressed. The "timing" can be defined either based on time or based on a position of the vehicle.

Further, according to a vehicle control system of a second aspect, an average of timings when the driver performs an acceleration operation while traveling on a curve is predicted as a timing when the driver performs an acceleration operation from the vehicle operation history of the driver in the past, and thus driving tendencies of the driver while traveling on a curve can be comprehended more precisely.

Further, according to a vehicle control system of a third aspect, a vehicle operation history of traveling on a curve that is not suitable for determining driving tendencies of the driver, such as a curve with a radius of curvature that is too large, a curve with the length of a curve section that is too short, or the like, can be excluded from comprehension targets of driving tendencies of the driver. Therefore, driving tendencies of the driver while traveling on a curve can be comprehended more precisely when exiting a curve.

Further, according to a vehicle control system of a fourth aspect, a vehicle operation history that is not suitable for determining driving tendencies of the driver when a side slip prevention device operates can be excluded from comprehension targets of driving tendencies of the driver. Therefore, driving tendencies of the driver while traveling on a curve can be comprehended more precisely.

Further, according to a vehicle control system of a fifth aspect, when traveling through consecutive curves, it is possible to prevent that an acceleration limit is performed again just after an acceleration limit on the vehicle is released. Therefore, behavior of the vehicle can be stabilized, and it would not give the driver a feeling of discomfort due to continuous control of the vehicle.

Further, according to a vehicle control method of a sixth aspect, it becomes possible to comprehend driving tendencies from a vehicle operation history of a driver in the past, and perform appropriate control of the vehicle in which driving tendencies of the driver are reflected on the control content. Particularly, when exiting a curve, permission control of acceleration of the vehicle can be performed at timing when the driver performs an acceleration operation, thereby allowing the driver to drive without getting stressed.

Further, by a computer program according to a seventh aspect, it becomes possible to allow a computer to comprehend driving tendencies from a vehicle operation history of a driver in the past, and perform appropriate control of the vehicle in which driving tendencies of the driver are reflected on the control content. Particularly, when exiting a curve, permission control of acceleration of the vehicle can be performed at timing when the driver performs an acceleration operation, thereby allowing the driver to drive without getting stressed.

BRIEF DESCRIPTION OF THE DRAWINGS

FIG. 18 is a diagram showing a calculation example of a target limiting vehicle speed in step 102.

DETAILED DESCRIPTION OF THE PREFERRED EMBODIMENTS

Hereinafter, a detailed explanation will be given based on an embodiment realizing a vehicle control system according to the present invention with reference to the drawings.

Figure 1:
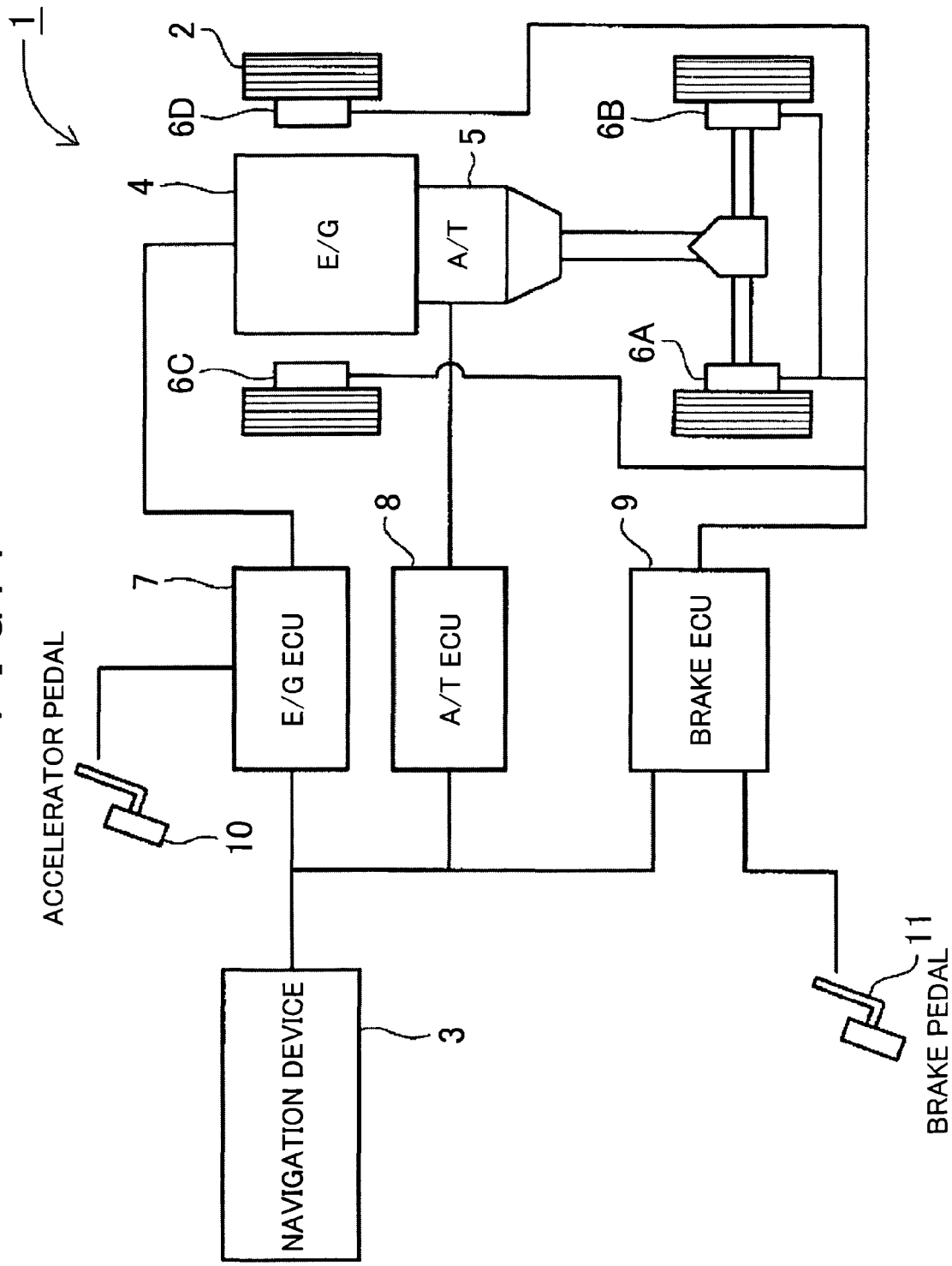
FIG. 1 is a schematic structural diagram of a vehicle control system according to an embodiment.

First, a schematic structure of a vehicle control system 1 according to the present invention will be explained using FIG. 1. FIG. 1 is a schematic structural diagram of the vehicle control system 1 according to this embodiment.

As shown in FIG. 1, the vehicle control system 1 according to this embodiment is constituted of a navigation device 3 installed in a vehicle 2, an engine 4, an automatic transmission (AT) 5, brakes 6A to 6D, an engine ECU 7, an AT ECU 8, a brake ECU 9, an accelerator pedal 10, a brake pedal 11, and so on.

Here, the navigation device 3 is fixed in a center console or on a panel face in the cabin of the vehicle 2, and includes a liquid crystal display for displaying a map or a searched route to a destination, a speaker for outputting audio guidance related to the route guidance, and so on. Then, the current position of the vehicle 2 is identified by a global positioning system (GPS) or the like, and when a destination is set, a search for a route to the destination and guidance according to the set route are performed using the liquid crystal display or the speaker. Further, the navigation device 3 according to the present invention performs, when traveling on a road with curves in particular, control of the vehicle (specifically, deceleration control, acceleration limit control and acceleration permission control of the vehicle with an electric throttle) so that the vehicle can travel at an optimum speed. Note that details of the navigation system 3 will be described later.

Further, the engine 4 is an internal combustion engine or the like driven by fuel such as gasoline, diesel, ethanol, or the like, and is used as a drive source of the vehicle 2. Then engine torque as driving force of the engine 4 is transferred to wheels via the AT 5, a propeller shaft and a drive shaft, thereby driving the vehicle 2.

Further, the AT 5 is a transmission having functions to switch the transmission gear ratio automatically according to speed or engine rotation speed. Then the AT 5 shifts engine torque generated in the engine 4 and transfers shifted torque to the propeller shaft. In addition, a CVT (continuously variable transmission) may be used as the AT 5.

Further, the brakes 6A to 6D, which are mounted respectively for wheels arranged at the front, rear, left and right of the vehicle 2, are mechanisms to lower the rotation speed of the wheels by friction. Note that types of the brakes include a drum brake and a disk brake.

Further, the engine ECU (electronic control unit) 7 is constituted of a CPU, a RAM, a ROM, and so on which are not shown, and is an electronic control unit controlling the engine 4. Further, the navigation device 3 and the accelerator pedal 10 are connected to the engine ECU 7. Then the engine ECU 7 controls an opening/closing amount of a throttle valve of the engine 4 or the like based on an instruction signal from the navigation device 3 and on an operation of the accelerator pedal 10.

Further, the AT ECU 8 is constituted of a CPU, a RAM, a ROM, and so on which are not shown, and is an electronic control unit controlling the AT 5. Further, the navigation device 3 is connected to the AT ECU 8. Then the AT ECU 8 controls the transmission gear ratio of the AT or the like based on an instruction signal from the navigation device 8.

Further, the brake ECU 9 is constituted of a CPU, a RAM, a ROM, and so on which are not shown, and is an electronic control unit controlling the brakes 6A to 6D. Further, the navigation device 3 and the brake pedal 11 are connected to the brake ECU 9. Then the brake ECU 9 controls braking amounts by the brakes 6A to 6D or the like based on an instruction signal from the navigation device 3 or an operation of the brake pedal 11.

Further, the accelerator pedal 10 is arranged on a driver seat side in the cabin of the vehicle 2, and is operated by the driver. Then, when the accelerator pedal 10 is operated by the driver, the pressed amount of the brake pedal 11 is transmitted to the engine ECU 7, and thereby the opening/closing amount of the throttle valve is adjusted. However, it is structured such that, in a state that an acceleration limit of the vehicle is performed as will be described later, the throttle valve does not open even when the accelerator pedal 10 is stepped on, and acceleration of the vehicle is not performed.

Further, the brake pedal 11 is arranged similarly on a driver seat side in the cabin of the vehicle 2, and is operated by the driver. Then, when the brake pedal 11 is operated by the driver, the pressed amount of the brake pedal 11 is transmitted to the brake ECU 9, and thereby the brake amount is adjusted.

Further, in the vehicle control system 1 according to this embodiment, electronic stability control (ESC) is provided as a system for preventing a side slip of the vehicle 2. When a side slip of the vehicle is detected at the time of abrupt steering operation or while traveling on a slippery road surface, this ESC performs control of the vehicle to keep the traveling direction of the vehicle automatically. Specifically, it adjusts and keeps the traveling direction of the vehicle 2 by appropriately braking the wheels.

Figure 2:
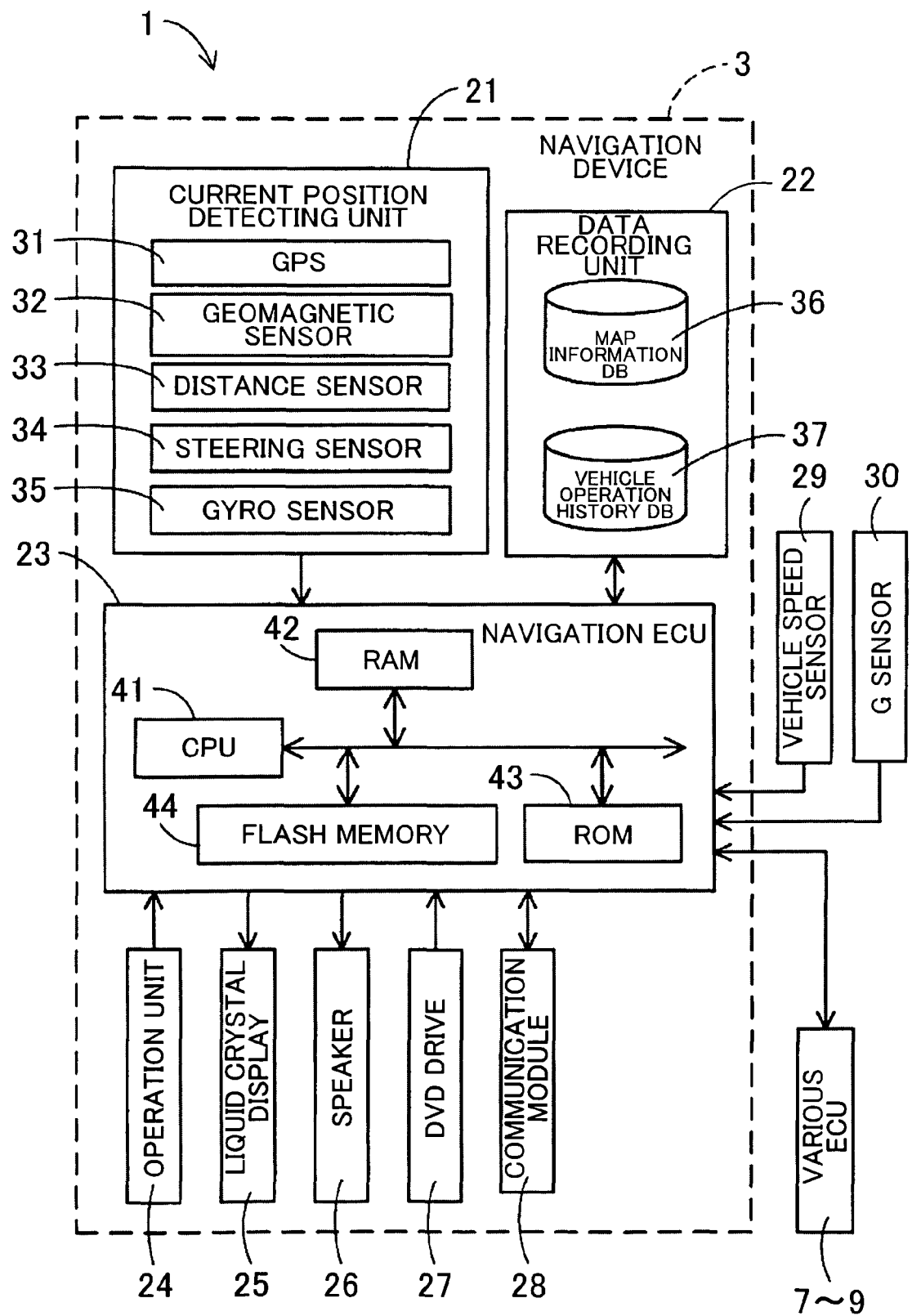
FIG. 2 is a block diagram schematically showing a control system for a navigation device according to this embodiment.

Next, the navigation device 3 constituting the above vehicle control system 1 will be explained in more detail using FIG. 2. FIG. 2 is a block diagram schematically showing a control system for the navigation device 3 according to this embodiment.

As shown in FIG. 2, the navigation device 3 according to this embodiment is constituted of a current position detecting unit 21 detecting the current position of the vehicle, a data recording unit 22 in which various data are recorded, a navigation ECU (curve detecting unit, a vehicle control unit, an acceleration permission timing obtaining unit, an acceleration timing storing unit, an acceleration average calculating unit, a curve shape obtaining unit, an ESC detecting unit, a distance determining unit) 23 performing various arithmetic processing based on inputted information, an operation unit 24 accepting operation from the user, a liquid crystal display 25 displaying a map of the surrounding of the vehicle to the user, a speaker 26 outputting audio guidance related to route guidance, a DVD drive 27 reading a DVD as a recording medium storing a program, and a communication module 28 communicating with an information center such as a traffic information center. Further, a vehicle speed sensor 29 detecting the traveling speed of the vehicle, a G sensor 30 detecting acceleration generated in a left and right direction of the vehicle 2, and the like are connected to the navigation ECU 23.

Hereinafter, the components constituting the navigation device 3 will be explained in order.

The current position detecting unit 21 is constituted of a GPS sensor 31, a geomagnetic sensor 32, a distance sensor 33, a steering sensor 34, a gyro sensor 35 as a direction detecting unit, an altimeter (not shown) and so on, and is able to detect the current position, direction, and the like of the vehicle.

Further, the data recording unit 22 includes a hard disk (not shown) as an external storage device and a recording medium, a map information database (DB) 36 recorded in the hard disk, a vehicle operation history database (DB) 37, a recording head (not shown) which is a driver for reading a predetermined program or the like and writing predetermined data on the hard disk.

Here, in the map information DB 36, various map data necessary for route guidance, traffic information guidance and map display are recorded. Specifically, it is constituted of facility data regarding facilities such as restaurants and parking areas, link data regarding road (link) shapes, node data regarding node points, intersection data regarding intersections, search data for searching for a route, search data for searching for a point, image display data for drawing images of a map, roads, traffic information, and the like on the liquid crystal display 25, and so on. Further, in the navigation device 3 according to this embodiment in particular, information regarding curve shapes between curve sections of roads is also recorded. Note that as the information regarding curve shapes stored in the map information DB 36, there are information to identify positions of an entrance clothoid start point (KA), a constant R start point (RS), a constant R end point (RE), and an exit clothoid end point (KE) of a curve.

Figure 3:
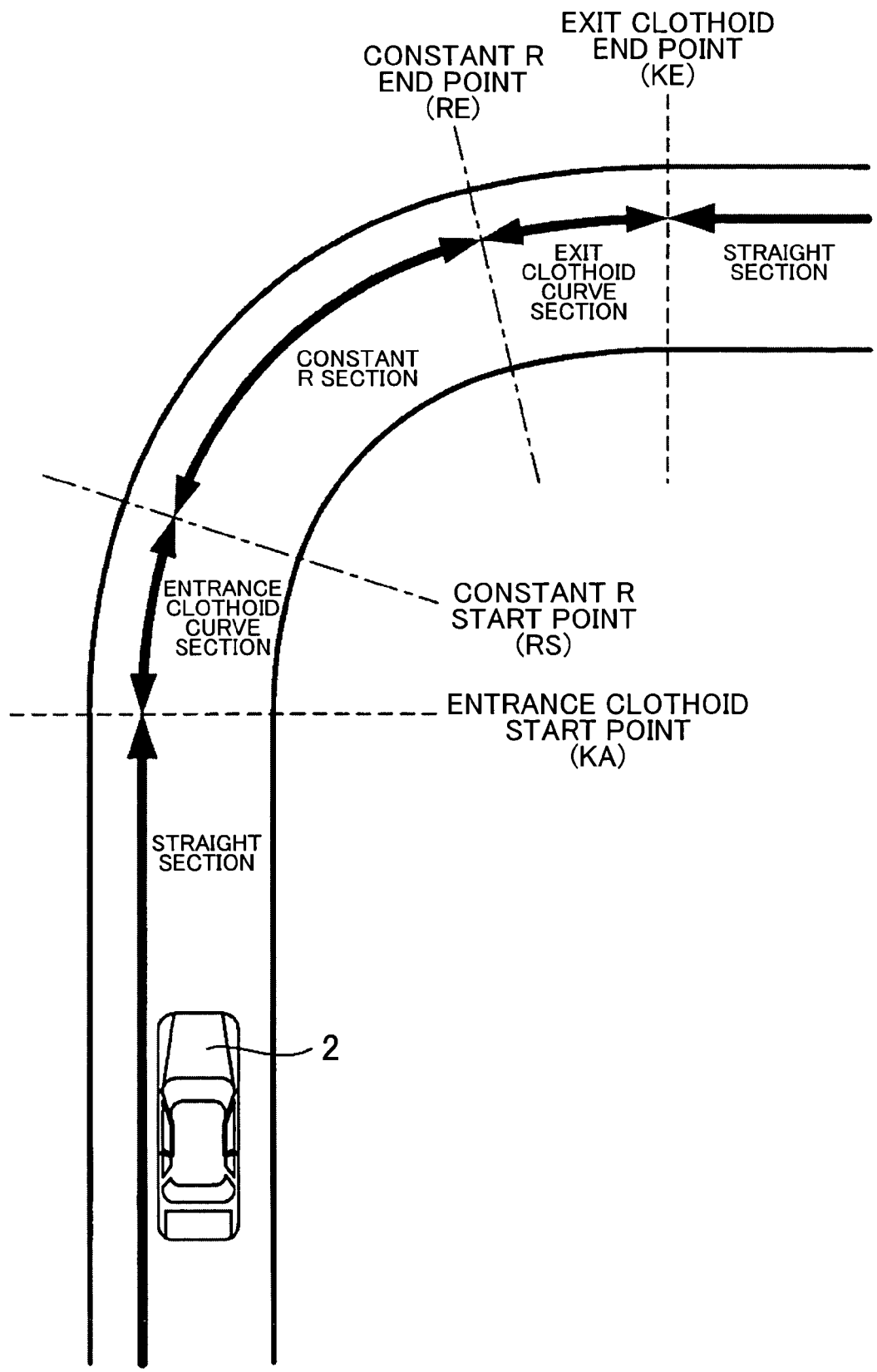
FIG. 3 is a diagram showing an example of a curve section formed on a road.

Hereinafter, the entrance clothoid start point (KA), the constant R start point (RS), the constant R end point (RE), and the exit clothoid end point (KE) will be explained using FIG. 3. FIG. 3 is a diagram showing an example of a curve section formed on a road.

As shown in FIG. 3, the curve section formed on a road is basically segmented in three areas. Specifically, it is constituted of (1) a constant R section drawing a constant radius of curvature, (2) an entrance clothoid curve section drawing a clothoid curve for connecting a straight section to the constant R section before the constant R section, and (3) an exit clothoid curve section drawing a clothoid curve for connecting the constant R section to a straight section after the constant R section.

Then the entrance clothoid start point KA identifies a point of switching from a straight section to an entrance clothoid curve section according to the traveling direction of the vehicle 2. Further, the constant R start point RS identifies a point of switching from the entrance clothoid curve section to the constant R section according to the traveling direction of the vehicle 2. Further, the constant R end point RE identifies a point of switching from the constant R section to the exit clothoid curve section according to the traveling direction of the vehicle 2. Furthermore, the exit clothoid end point KE identifies a point of switching from the exit clothoid curve section to a straight section according to the traveling direction of the vehicle 2. Note that the entrance clothoid start point KA and the exit clothoid end point KE, the constant R start point RS and the constant R end point RE change positions from one to another according to the traveling direction of the vehicle 2.

Further, the vehicle operation history DB 37 is a database in which a driving operation history of the driver in the past are stored. Specifically, when the vehicle 2 traveled through a curve section in the past, "(a) deceleration start point where the driver started a deceleration operation" and "(b) acceleration start point where the driver started an acceleration operation after performing the deceleration operation" are stored cumulatively. Then the navigation ECU 23 adjusts the timing to perform deceleration control (acceleration control) and the timing to permit acceleration based on the vehicle operation history stored in the vehicle operation history DB 37.

On the other hand, the navigation ECU (electronic control unit) 23 is an electronic control unit performing control of the entire navigation device 3, such as guide route setting processing to set, when a destination is selected, a guide route from the current position to the destination, vehicle control processing to perform control of the vehicle while traveling on a curve, and so on. Then the navigation ECU 23 includes a CPU 41 as an arithmetic unit and a control unit, as well as internal storage devices such as a RAM 42 which is used as a working memory when various arithmetic processing operations are performed by the CPU 41 and in which route data and so on when a route is searched are stored, a ROM 43 in which a vehicle control processing program (refer to FIG. 4 to FIG. 15) and so on are recorded besides a program for control, and a flash memory 44 in which a program read from the ROM 43 is recorded.

The operation unit 24 is operated when inputting a place of departure as a guidance start point and a destination as a guidance end point, or the like, and constituted of a plurality of operation switches (not shown) such as various keys and buttons. Then the navigation ECU 23 performs control to execute various corresponding operations based on a switch signal outputted by pressing of respective switches, or the like. In addition, this unit can be constituted of a touch panel provided on a front face of the liquid crystal display 25.

Further, on the liquid crystal display 25, a map image including roads, traffic information, an operation guidance, an operation menu, a guidance for keys, a guide route from the current position to a destination, guidance information along the guide route, news, weather information, time, e-mails, a television program, and the like are displayed.

Further, the speaker 26 outputs audio guidance guiding for traveling along the guidance route based on an instruction from the navigation ECU 23 or a traffic information guide.

Further, the DVD drive 27 is a drive capable of reading data recorded in a recording medium such as DVD, CD, or the like. Then, based on the read data, updating of the map information DB 36 is performed.

Further, the communication module 28 is a communication device for receiving traffic information constituted of various information such as traffic jam information, restriction information, traffic accident information, and/or the like transmitted from a traffic information center such as, for example, a VICS (registered trademark: Vehicle Information and Communication System) center, a probe center, or the like. The communication module 28 corresponds to, for example, a mobile phone or a DCM.

Further, the vehicle speed sensor 29 is a sensor for detecting a traveling distance of the vehicle and the vehicle speed, and generates a pulse according to the rotation of a wheel of the vehicle and outputs a pulse signal to the navigation ECU 23. Then the navigation ECU 23 calculates the rotation speed of a wheel and the traveling distance by counting the generated pulse.

On the other hand, the G sensor 30 is a sensor for detecting acceleration generated in a left and right direction of the vehicle 2, that is, acceleration (lateral G) based on a centrifugal force generated in a normal direction when the vehicle 2 turns on a curve.

Figure 4:
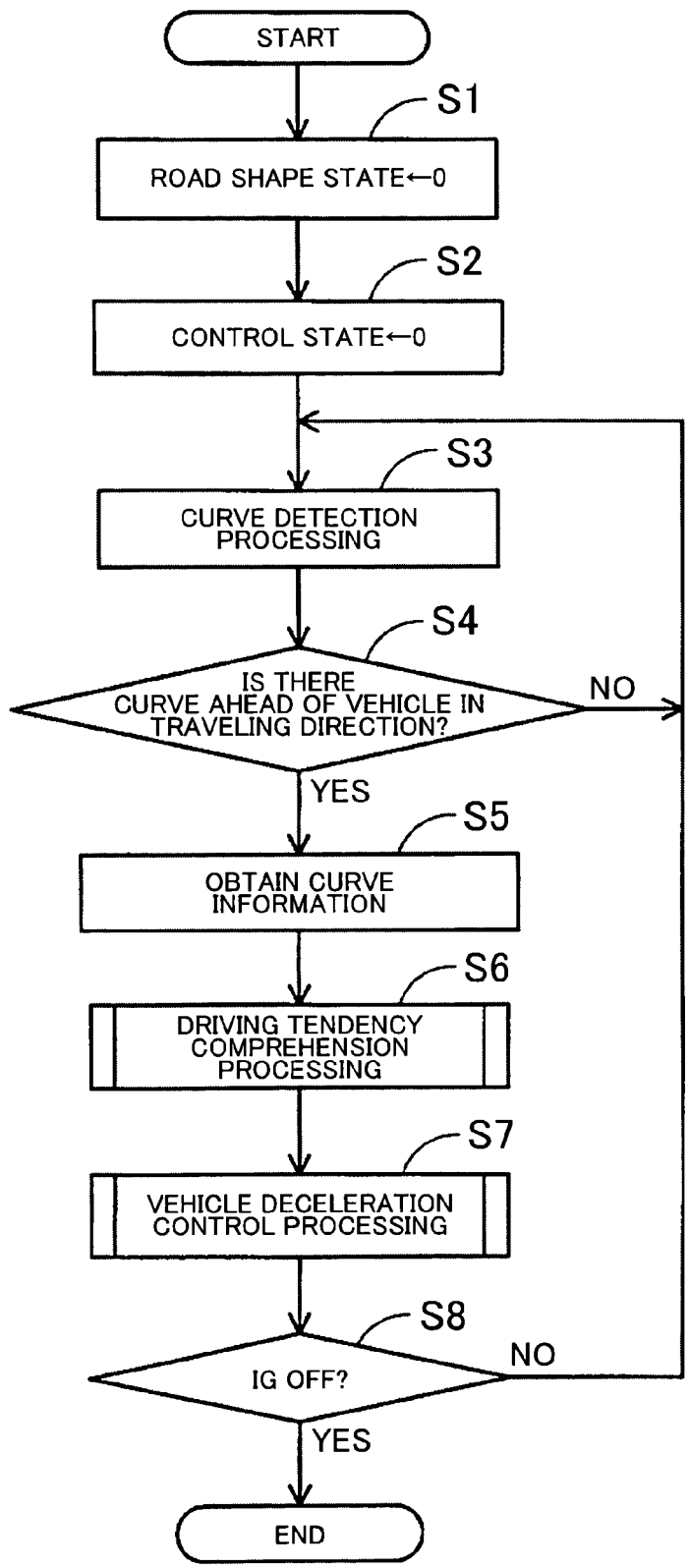
FIG. 4 is a flowchart of a vehicle control processing program executed by the vehicle control system according to this embodiment.

Next, a vehicle control processing program executed by the navigation ECU 23 in the vehicle control system 1 having the above structure will be explained based on FIG. 4 to FIG. 15. FIG. 4 is a flowchart of the vehicle control processing program according to this embodiment. Here, the vehicle control processing program is executed just after the ignition of the vehicle is turned on, and performs vehicle control considering driving tendencies of the driver while traveling on a curve. Incidentally, programs represented by flowcharts in FIG. 4 to FIG. 15 as follows are stored in the RAM 42 or the ROM 43 provided in the navigation device 3, and are executed by the CPU 41.

First, in the vehicle control processing program, the CPU 41 performs initialization processing of memories and so on. Specifically, first in step (hereinafter abbreviated as S) 1, the CPU 41 reads a road shape state stored in the RAM 42, substitutes "0" therein and stores it again. Further, in S2, the CPU 41 reads a control state stored in the RAM 42, substitutes "0" therein and stores it again.

Next, in S3, the CPU 41 performs curve detection processing to detect a curve located ahead of the vehicle in the traveling direction. Specifically, first the current position of the vehicle is identified by the GPS 31, and map matching is performed, in which the current position of the vehicle is identified on a map from the map information stored in the map information DB 36. Then, from curve position information stored in the map information DB 36, a curve within a predetermined distance (within 200 m for example) ahead of the vehicle in the traveling direction is detected. In addition, the above S3 corresponds to processing of the curve detecting unit.

Subsequently, in S4, the CPU 41 determines whether a curve is detected or not within the predetermined distance (within 200 m for example) ahead of the vehicle in the traveling direction by a curve detecting unit in the above S3. As a result, when it is determined that a curve is detected within the predetermined distance ahead of the vehicle in the traveling direction (S4: YES), the CPU 41 proceeds to S5. Otherwise, when it is determined that no curve is detected within the predetermined distance ahead of the vehicle in the traveling direction (S4: NO), the CPU 41 returns to S3 and performs detection of a curve based on a new vehicle position.

In S5, the CPU 41 obtains curve information about the curve located ahead of the vehicle in the traveling direction. Specifically, the CPU 41 obtains respective position coordinates of the entrance clothoid start point KA, the constant R start point RS, the constant R end point RE, and the exit clothoid end point KE (refer to FIG. 3). Note that this S5 corresponds to processing of the curve shape obtaining unit.

Thereafter, in S6, the CPU 41 performs driving tendency comprehension processing (FIG. 5), which will be described later. Note that the driving tendency comprehension processing is processing of comprehending driving tendencies (operation tendencies) of the driver based on the vehicle operation history of the driver driving the vehicle.

Furthermore, in S7, the CPU 41 performs vehicle deceleration control processing (FIG. 12), which will be described later. Note that the vehicle deceleration control processing is processing to perform deceleration control, acceleration limit control and acceleration permission control of the vehicle considering the driving tendencies of the driver comprehended in the above S6. Further, this S7 corresponds to processing of the vehicle control unit.

Next, in S8, the CPU 41 determines whether the ignition of the vehicle is turned off or not. Then, when the ignition of the vehicle is turned off (S8: YES), the vehicle control processing is finished. Otherwise, when the ignition of the vehicle is not turned off (S8: NO), the CPU 41 returns to S3, and performs detection of a curve again based on a new vehicle position.

Figure 5:
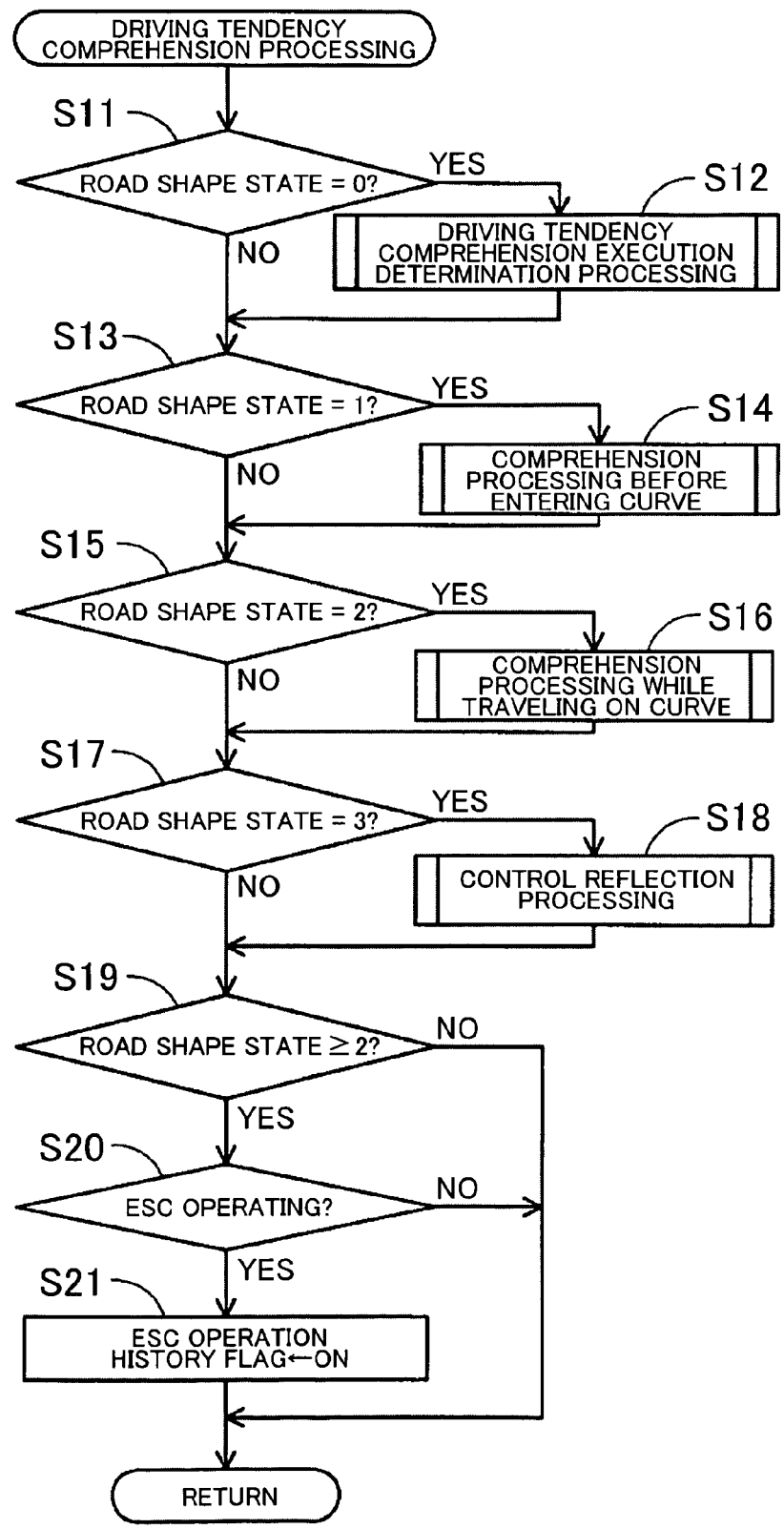
FIG. 5 is a flowchart of a sub-processing program of driving tendency comprehension processing executed by the vehicle control system according to this embodiment.

Next, sub-processing of the driving tendency comprehension processing in the above S6 will be explained based on FIG. 5. FIG. 5 is a flowchart of a sub-processing program of the driving tendency comprehension processing.

First, in S11, the CPU 41 reads the road shape state stored in the RAM 42 and determines whether the value is "0" or not. Note that the road shape state is a status of identifying the traveling position of the vehicle relatively with respect to a curve. Then, the road shape state is initialized in the above S1, and any one of values "1" to "3" is substituted therein in comprehension processing before entering a curve (FIG. 7), comprehension processing while traveling on a curve (FIG. 8), and control reflection processing (FIG. 9), which will be described later.

When it is determined that the road shape state is "0" as a result of determination in the above S11 (S11: YES), the CPU 41 proceeds to S12. In S12, the CPU 41 executes driving tendency comprehension execution determination processing (FIG. 6), which will be described later. Note that the driving tendency comprehension execution determination processing is processing to determine, based on the curve shape, whether or not a curve located ahead of the vehicle in the traveling direction is suitable as a target of learning when comprehending driving tendencies of the driver. On the other hand, when it is determined that the road shape state is other than "0" as a result of determination in the above S11 (S11: NO), the CPU 41 proceeds to S13.

Next, in S13, the CPU 41 reads the road shape state stored in the RAM 42, and determines whether the value is "1" or not.

Then, when it is determined that the road shape state is "1" as a result of determination in the above S13 (S13: YES), the CPU 41 proceeds to S14. In S14, the CPU 41 executes comprehension processing before entering a curve (FIG. 7), which will be described later. Note that the comprehension processing before entering a curve is processing to comprehend, among driving tendencies of the driver, particularly a deceleration start point before traveling on a curve based on a vehicle operation by the driver before traveling on the curve. On the other hand, when it is determined that the road shape state is other than "1" as a result of determination in the above S13 (S13: NO), the CPU 41 proceeds to S15.

Next, in S15, the CPU 41 reads the road shape state stored in the RAM 42 and determines whether the value is "2" or not.

Then, when it is determined that the road shape state is "2" as a result of determination in the above S15 (S15: YES), the CPU 41 proceeds to S16. In S16, the CPU 41 executes comprehension processing while traveling on a curve (FIG. 8), which will be described later. Note that the comprehension processing while traveling on a curve is processing to comprehend, among driving tendencies of the driver, particularly an acceleration start distance ratio while traveling on a curve based on a vehicle operation by the driver while traveling on the curve. On the other hand, when it is determined that the road shape state is other than "2" as a result of determination in the above S15 (S15: NO), the CPU 41 proceeds to S17.

Furthermore, in S17, the CPU 41 reads the road shape state stored in the RAM 42 and determines whether the value is "3" or not.

Then, when it is determined that the road shape state is "3" as a result of determination in the above S17 (S17: YES), the CPU 41 proceeds to S18. In S18, the CPU 41 executes control reflection processing (FIG. 9), which will be described later. Note that the control reflection processing is processing to reflect the driving tendencies before entering a curve and while traveling on a curve, which are comprehended in the above S14 and S16, on control of the vehicle. On the other hand, when it is determined that the road shape state is other than "3" as a result of determination in the above S17 (S17: NO), the CPU 41 proceeds to S19.

Thereafter, in S19, the CPU 41 reads the road shape state stored in the RAM 42 and determines whether the value is "2" or larger or not.

Then, when it is determined that the road shape state is "2" or larger as a result of determination in the above S19 (S19: YES), the CPU 41 proceeds to S20. Otherwise, when it is determined that the road shape state is "1" or smaller (S19: NO), the CPU 41 finishes the driving tendency comprehension processing and proceeds to S7.

In S20, the CPU 41 determines whether the ESC is operating or not. Note that the ESC is a system, as described above, which controls the vehicle when a side slip of the vehicle is detected at the time of abrupt steering operation or while traveling on a slippery road surface, and controls the vehicle so as to keep the traveling direction of the vehicle automatically. Further, the S20 corresponds to processing of the ESC detecting unit.

Then, when it is determined that the ESC is operating as a result of determination in the above S20 (S20: YES), the CPU 41 sets an ESC operation history flag stored in the RAM 42 to "ON" (S21). In addition, when the ESC operation history flag is set to "ON", the processing to reflect driving tendencies of the driver comprehended as will be described later on the control of the vehicle is not performed. On the other hand, when it is determined that the ESC is not operating (S20: NO), the CPU 41 finishes the driving tendency comprehension processing and proceeds to S7.

Figure 6:
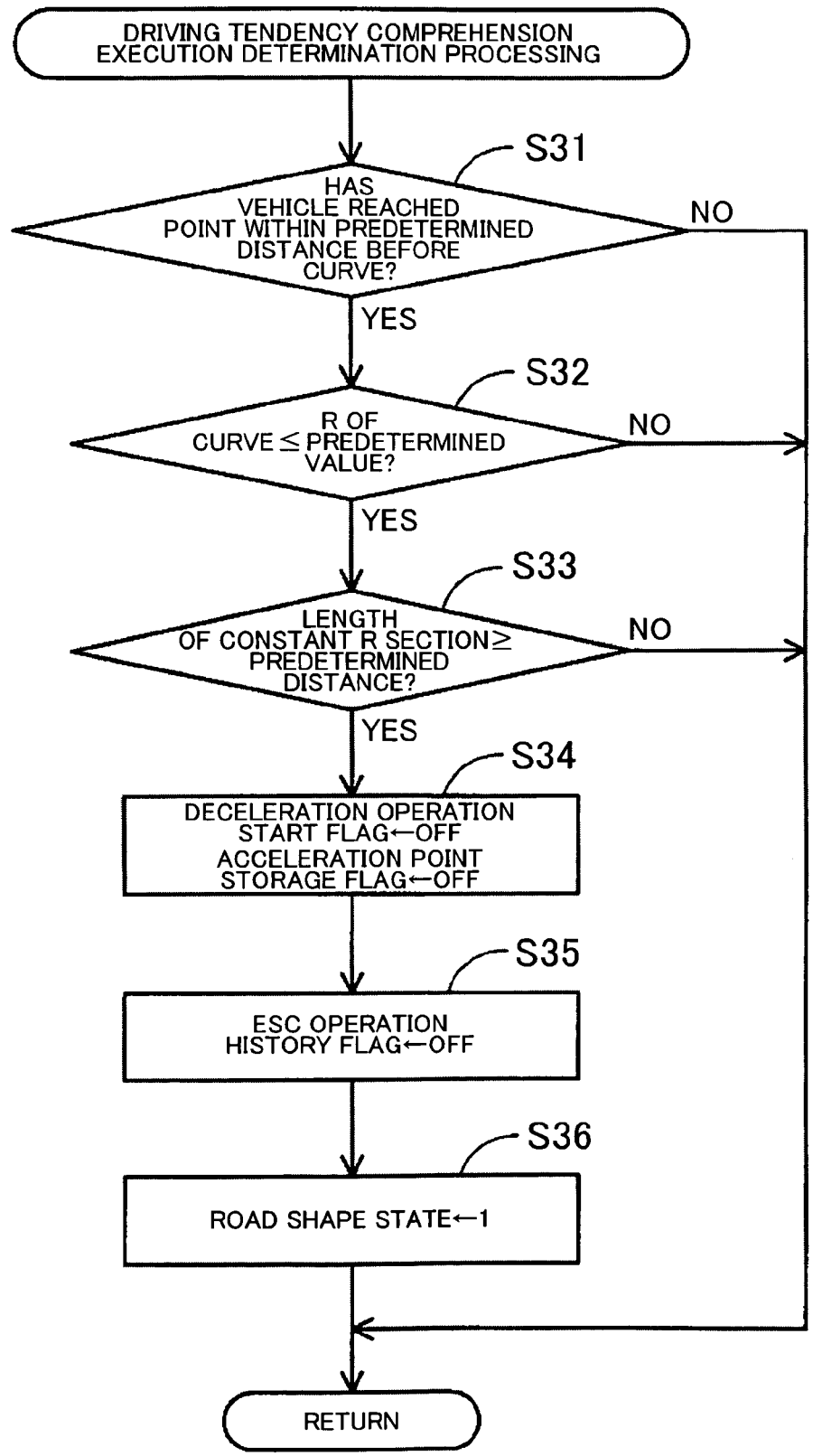
FIG. 6 is a flowchart of a sub-processing program of driving tendency comprehension execution determination processing executed by the vehicle control system according to this embodiment.

Next, sub-processing of the driving tendency comprehension execution determination processing in the above S12 will be explained based on FIG. 6. FIG. 6 is a flowchart of a sub-processing program of the driving tendency comprehension execution determination processing.

First, in S31, the CPU 41 determines whether or not the vehicle has reached a point within a predetermined distance before a curve (specifically, a point within a predetermined distance (for example 100 m) from the entrance clothoid start point KA (refer to FIG. 3)), based on the current position of the vehicle and the curve information obtained in the above S5.

Then, when it is determined that the vehicle has reached the point within the predetermined distance before the curve (S31: YES), the CPU 41 proceeds to S32. Otherwise, when it is determined that the vehicle has not reached the point within the predetermined distance before the curve (S31: NO), the CPU 41 finishes the driving tendency comprehension execution determination processing and proceeds to S13.

In S32, the CPU 41 determines whether or not the radius of curvature of the curve ahead of the vehicle in the traveling direction is equal to or smaller than a predetermined value based on the curve information obtained in the S5. Then, when it is determined that the radius of curvature of the curve is equal to or smaller than the predetermined value (S32: YES), the CPU 41 further determines in S33 whether or not the constant R section (refer to FIG. 3) of the curve ahead of the vehicle in the traveling direction has a length equal to or longer than a predetermined distance.

Then, when it is determined that the constant R section of the curve has a length equal to or longer than the predetermined distance (S33: YES), the CPU 41 proceeds to S34. On the other hand, when it is determined that the radius of curvature of the curve is larger than the predetermined value (S32: NO) or when it is determined that the constant R section of the curve has a length shorter than the predetermined distance (S33: NO), the curve ahead is not suitable for determining driving tendencies of the driver, and hence the CPU 41 finishes the driving tendency comprehension execution determination processing without substituting "1" into the road shape state and proceeds to S13.

In S34, the CPU 41 sets a deceleration operation start flag and an acceleration point storage flag stored in the RAM 42 to "OFF". Further, in S35, the CPU 41 sets the ESC operation history flag stored in the RAM 42 to "OFF". Furthermore, in S36, for storing a vehicle operation by the driver and comprehending driving tendencies hereafter, the CPU 41 reads the road shape state stored in the RAM 42 and substitutes a value "1" therein. Thereafter, the CPU 41 proceeds to S13.

Figure 7:
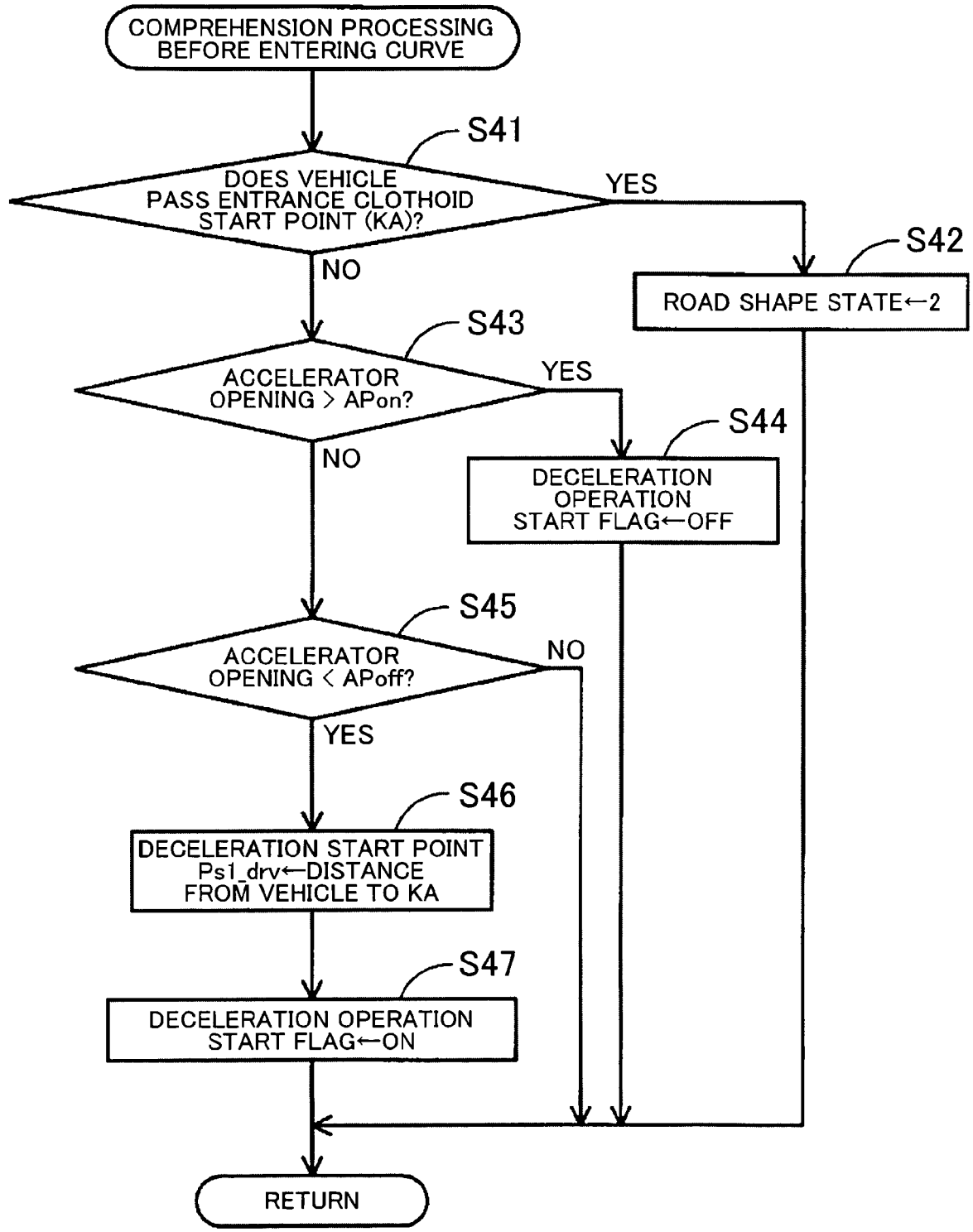
FIG. 7 is a flowchart of a sub-processing program of comprehension processing before entering a curve executed by the vehicle control system according to this embodiment.

Next, sub-processing of the comprehension processing before entering a curve in the above S14 will be explained based on FIG. 7. FIG. 7 is a flowchart of a sub-processing program of the comprehension processing before entering a curve.

First, in S41, the CPU 41 determines whether the vehicle has passed the entrance clothoid start point KA (refer to FIG. 3) or not based on the current position of the vehicle and the curve information obtained in the above S5.

Then, when it is determined that the vehicle has passed the entrance clothoid start point KA (S41: YES), the CPU 41 proceeds to S42. In S42, the CPU 41 reads the road shape state stored in the RAM 42 and substitutes a value "2" therein. Thereafter, the CPU 41 proceeds to S15. Otherwise, when it is determined that the vehicle has not passed the entrance clothoid start point KA (S41: NO), the CPU 41 proceeds to S43.

In S43, the CPU 41 detects the operation state of the accelerator pedal 10, and determines whether the accelerator opening is larger than a predetermined value (APon: for example 50%) or not. As a result, when it is determined that the accelerator opening is larger than the predetermined value APon (S43: YES), the CPU 41 assumes that the driver has not started a decelerating operation before entering the curve and proceeds to S44, and sets the deceleration operation start flag stored in the RAM 42 to "OFF" (S44). Thereafter, the CPU 41 proceeds to S15. Otherwise, when it is determined that the accelerator opening is equal to or smaller than the predetermined value APon (S43: NO), the CPU 41 proceeds to S45.

In S45, the CPU 41 detects the operation state of the accelerator pedal 10, and determines whether the accelerator opening is smaller than a predetermined value (APoff: for example 2% to 3%) or not. As a result, when it is determined that the accelerator opening is smaller than the predetermined value APoff (S45: YES), the CPU 41 assumes that the driver has started a deceleration operation before entering a curve and proceeds to S46. Otherwise, when it is determined that the accelerator opening is equal to or larger than the predetermined value APoff (S45: NO), the CPU 41 assumes that the driver has not started the decelerating operation before entering the curve and proceeds to S15.

Figure 16:
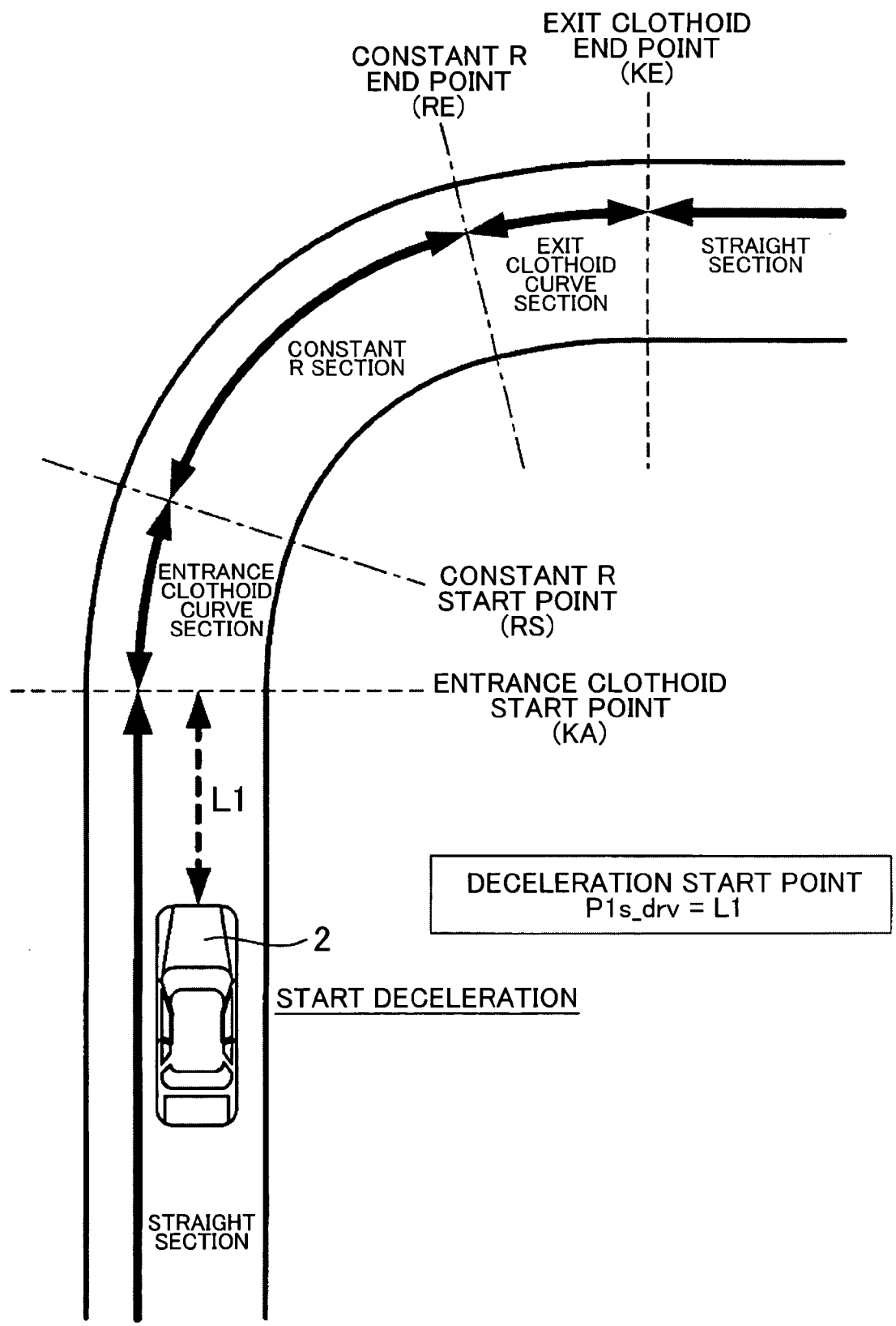
FIG. 16 is a diagram showing a calculation example of a deceleration start point in step 46.

In S46, first the CPU 41 detects the current position of the vehicle by the GPS 31, and calculates a distance L1 from the vehicle to the entrance clothoid start point KA as shown in FIG. 16. Then the CPU 41 reads a deceleration start point Ps1_drv stored in the vehicle operation history DB 37 and substitutes the calculated distance L1 therein. Thus, the timing when the driver performed the deceleration operation on the curve of this time (namely, deceleration start point) is stored.

Subsequently, in S47, the CPU 41 sets the deceleration operation start flag stored in the RAM 42 to "ON". Thereafter, the CPU 41 proceeds to S15.

Figure 8:
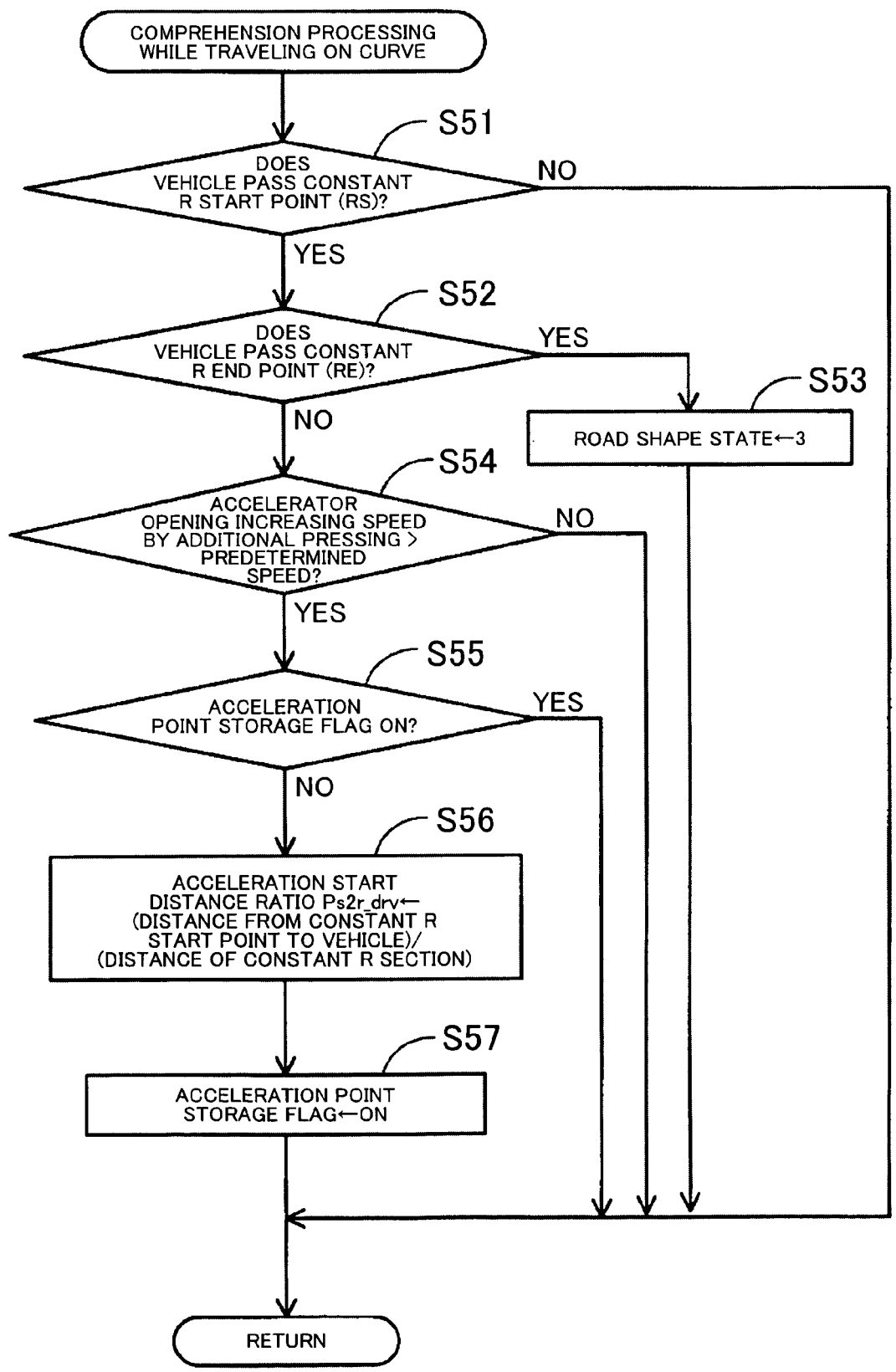
FIG. 8 is a flowchart of a sub-processing program of comprehension processing while traveling on a curve executed by the vehicle control system according to this embodiment.

Next, sub-processing of the comprehension processing while traveling on a curve in the above S16 will be explained based on FIG. 8. FIG. 8 is a flowchart of a sub-processing program of the comprehension processing while traveling on a curve.

First, in S51, the CPU 41 determines whether the vehicle has passed the constant R start point RS (refer to FIG. 3) or not based on the current position of the vehicle and the curve information obtained in the above S5.

Then, when it is determined that the vehicle has passed the constant R start point RS (S51: YES), the CPU 41 further determines in S52 whether the vehicle has passed the constant R end point RE or not. Otherwise, when it is determined that the vehicle has not passed the constant R start point RS (S51: NO), the CPU 41 proceeds to S17.

When it is determined that the vehicle has also passed the constant R end point RE as a result of determination in S52 (S52: YES), the CPU 41 reads the road shape state stored in the RAM 42 and substitutes a value "3" therein. Thereafter, the CPU 41 proceeds to S17. Otherwise, when it is determined that the vehicle has not passed the constant R end point RE (S52: NO), the CPU 41 proceeds to S54.

In S54, the CPU 41 detects the operation state of the accelerator pedal 10 and determines whether the accelerator opening increasing speed by additional pressing is larger than a predetermined speed or not. As a result, when it is determined that the accelerator opening increasing speed by additional pressing is larger than the predetermined speed (S54: YES), the CPU 41 assumes that the driver has performed an acceleration operation while traveling on the curve, and proceeds to S55. Otherwise, when it is determined that the accelerator opening increasing speed by additional pressing is equal to or smaller than the predetermined speed (S54: NO), the CPU 41 proceeds to S17.

In S55, the CPU 41 reads the acceleration point storage flag stored in the RAM 42 and determines whether it is set to "ON" or not. Note that when an acceleration operation is already performed within the same curve, the acceleration point storage flag is set to "ON" in S57, which will be described later.

Then, when it is determined that the acceleration point storage flag is set already to "ON" (S55: YES), the CPU 41 proceeds to S17 without storing a timing at which the driver newly performed an acceleration operation. Otherwise, when it is determined that the acceleration point storage flag is set to "OFF" (S55: NO), the CPU 41 proceeds to S56.

Figure 17:
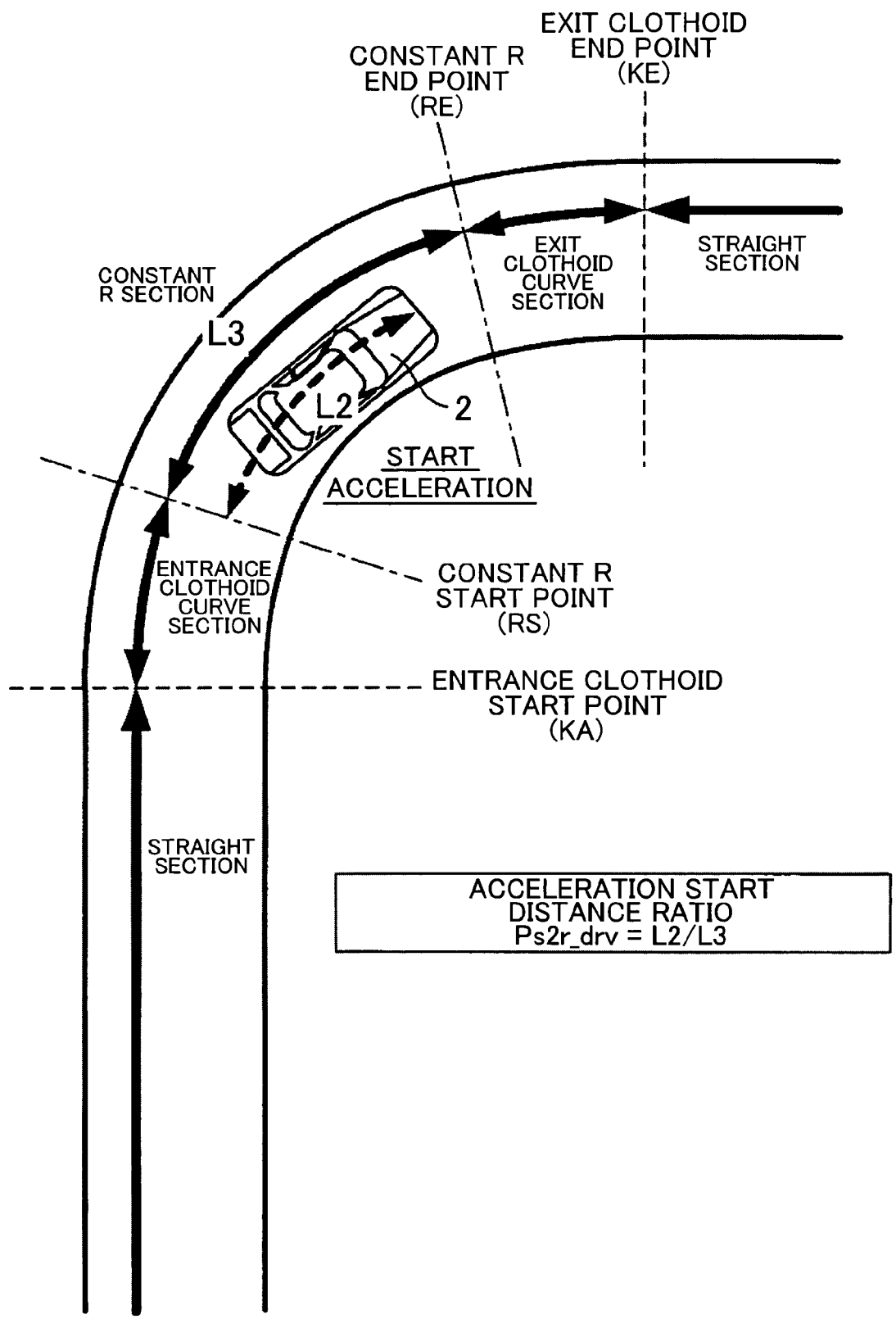
FIG. 17 is a diagram showing a calculation example of an acceleration start distance ratios in step 56.

In S56, first the CPU 41 detects the current position of the vehicle by the GPS 31, and calculates a distance L2 from the constant R start point RS to the vehicle as shown in FIG. 17. Further, the CPU 41 obtains a distance L3 of the constant R section from the map information DB 36. Thereafter, the CPU 41 calculates the ratio (L2/L3) of distances until the driver performs an acceleration operation with respect to the constant R section. Then the CPU 41 reads an acceleration start distance ratio Ps2r_drv stored in the vehicle operation history DB 37, and substitutes the calculated ratio (L2/L3) of distances therein. In addition, the acceleration start distance ratio Ps2r_drv is calculated for every radius of curvature of a curve (for example, R=10 to 20, 20 to 30, ... ), and stored. Thus, the timing when the driver performed the acceleration operation on the curve of this time (namely, acceleration start point) is stored. Note that the above S56 corresponds to processing of the acceleration timing storing unit.

Subsequently, in S57, the CPU 41 sets the acceleration point storage flag stored in the RAM 42 to "ON". Thereafter, the CPU 41 proceeds to S17.

Figure 9:
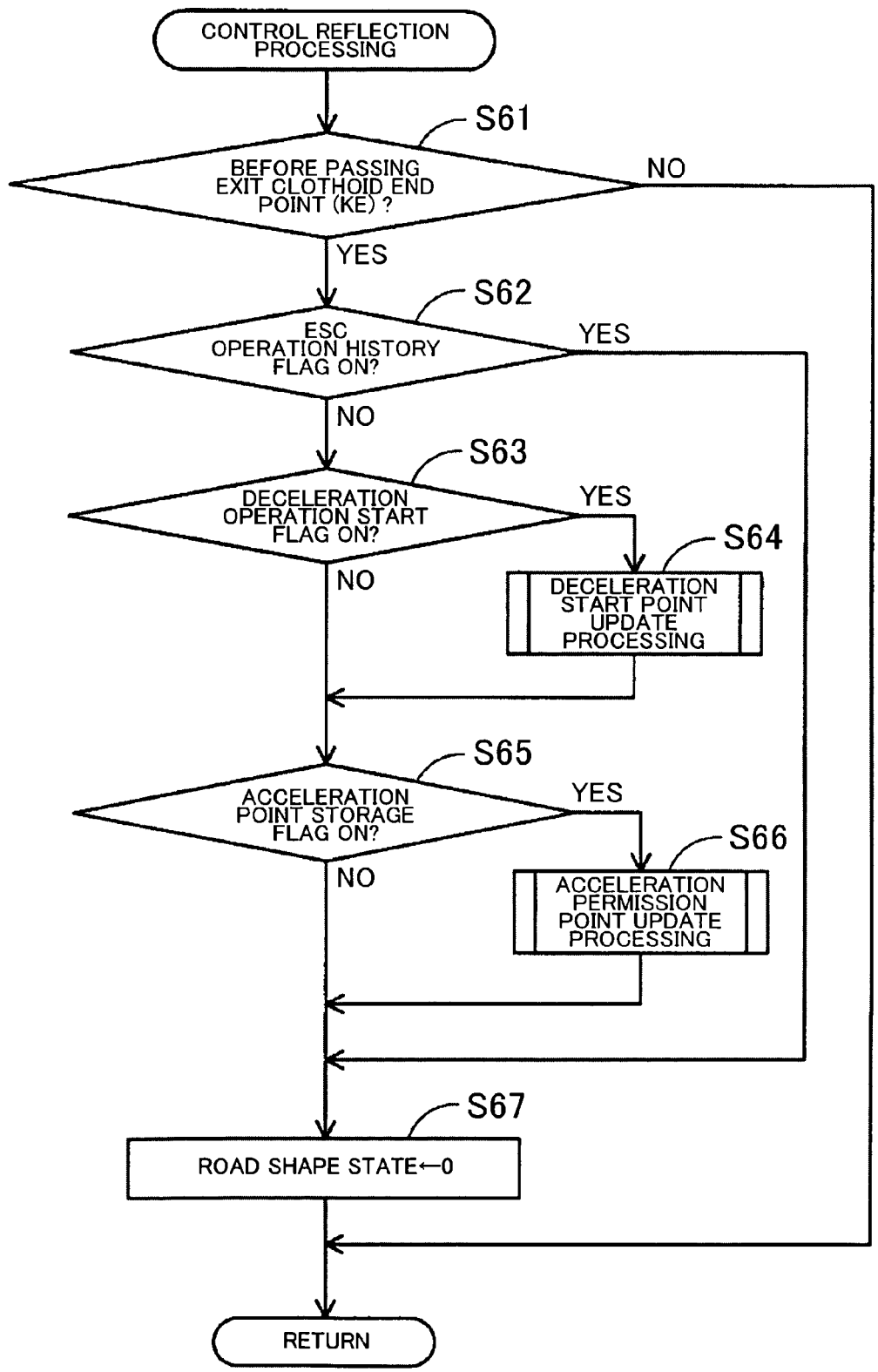
FIG. 9 is a flowchart of a sub-processing program of control reflection processing executed by the vehicle control system according to this embodiment.

Next, sub-processing of the control reflection processing in the above S18 will be explained based on FIG. 9. FIG. 9 is a flowchart of a sub-processing program of the control reflection processing.

First, in S61, the CPU 41 determines whether the vehicle has not passed the exit clothoid end point KE (refer to FIG. 3) or not based on the current position of the vehicle and the curve information obtained in the above S5.

Then when it is determined that the vehicle has not passed the exit clothoid end point KE (S61: YES), the CPU 41 proceeds to S62. Otherwise, when it is determined that the vehicle has passed the exit clothoid end point KE (S61: NO), the traveling on the curve is already finished, and hence the CPU 41 proceeds to S19.

In S62, the CPU 41 reads the ESC operation history flag stored in the RAM 42, and determines whether it is set to "ON" or not. Note that the ESC operation history flag is set to "ON" in the above S21 when the ESC operates while traveling on a curve.

Then, when it is determined that the ESC operation history flag is set to "ON" (S62: YES), the timing of starting deceleration and the timing of starting acceleration by the driver which are stored in the above S46 and S56 while traveling on the curve of this time are not used for comprehending driving tendencies of the driver. Therefore, without performing deceleration start point update processing and acceleration permission point update processing, which will be described later, the road shape state stored in the RAM 42 is read and a value "0" is substituted therein (S67). Thereafter, the CPU 41 proceeds to S19.

On the other hand, when it is determined that the ESC operation history flag is set to "OFF" (S62: NO), the timing of starting deceleration and the timing of starting acceleration by the driver stored in the above S46 and S56 while traveling on the curve of this time are used for comprehending driving tendencies of the driver. Then in S63, the CPU 41 reads the deceleration operation start flag stored in the RAM 42 and determines whether it is set to "ON" or not.

As a result, when it is determined that the deceleration operation start flag is set to "ON" (S63: YES), deceleration start point update processing (FIG. 10), which will be described later, is performed in S64. Note that the deceleration start point update processing is processing to correct a deceleration control start distance Ps1 which is currently set based on the timing of starting deceleration by the driver stored in the above S46. Otherwise, when it is determined that the deceleration operation start flag is set to "OFF" (S63: NO), the CPU 41 proceeds to S65.

In S65, the CPU 41 reads the acceleration point storage flag stored in the RAM 42 and determines whether it is set to "ON" or not. As a result, when it is determined that the acceleration point storage flag is set to "ON" (S65: YES), acceleration permission point update processing (FIG. 11), which will be described later, is performed in S66. Note that the acceleration permission point update processing is processing to correct an acceleration control start distance ratio Ps2r which is currently set based on the timing of starting acceleration by the driver stored in the above S56. Otherwise, when it is determined that the acceleration point storage flag is set to "OFF" (S65: NO), the CPU 41 proceeds to S67.

In S67, the CPU 41 reads the road shape state stored in the RAM 42, and substitutes a value "0" therein. Thereafter, the CPU 41 proceeds to S19.

Figure 10:
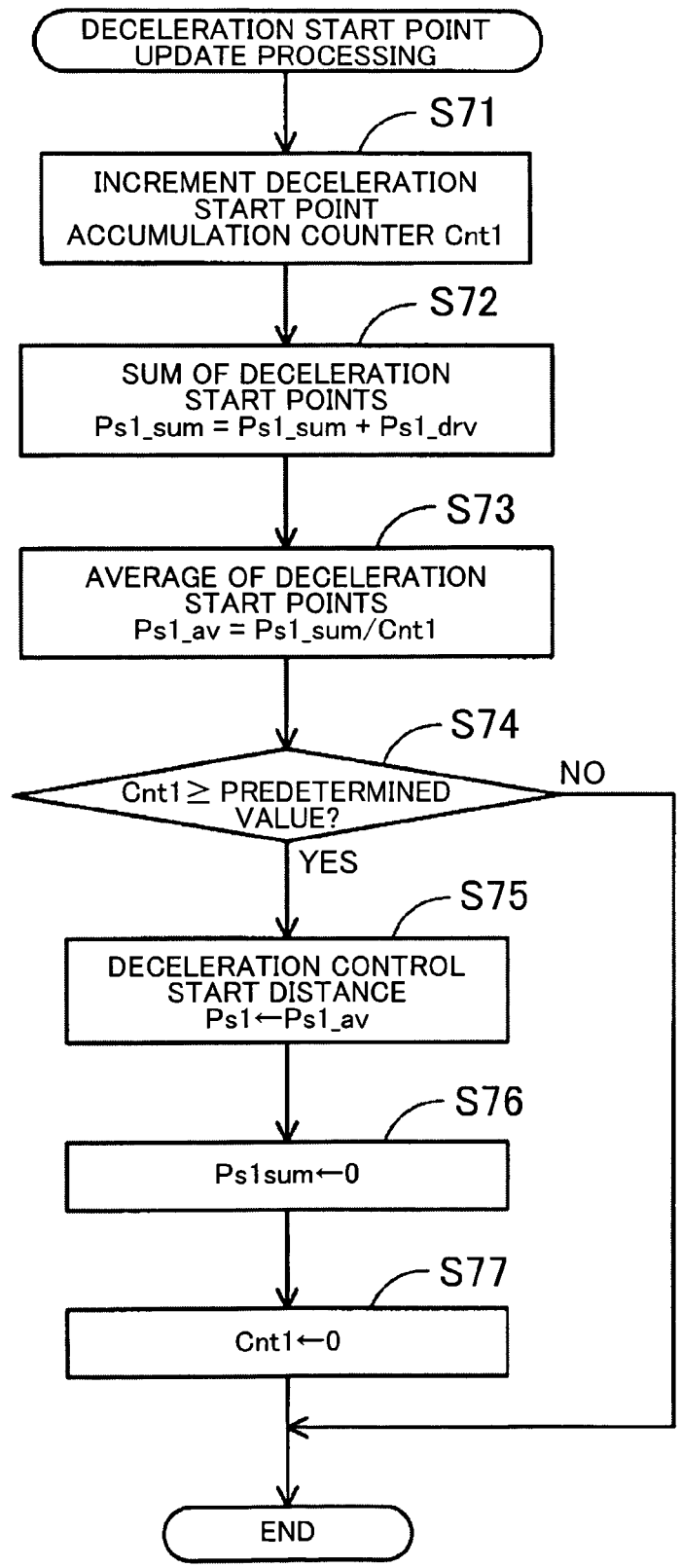
FIG. 10 is a flowchart of a sub-processing program of deceleration start point update processing executed by the vehicle control system according to this embodiment.

Next, sub-processing of the deceleration start point update processing in the above S64 will be explained based on FIG. 10. FIG. 10 is a flowchart of a sub-processing program of the deceleration start point update processing.

First, in S71, the CPU 41 reads and increments a deceleration start point accumulation counter Cnt1 stored in the RAM 42.

Next, in S72, the CPU 41 adds the deceleration start point Ps1_drv, which is the timing of the deceleration operation by the driver comprehended in the curve on which the vehicle traveled this time, to a sum Ps1_sum of deceleration start points of a predetermined number of times in the past, which is stored in the vehicle operation history DB 37.

Subsequently, in S73, the CPU 41 calculates an average Ps1_av of deceleration start points of a predetermined number of times in the past including the timing of the deceleration operation by the driver comprehended in the curve of this time.

Thereafter, in S74, the CPU 41 reads the deceleration start point accumulation counter Cnt1 stored in the RAM 42 and determines whether or not the counter value is equal to or larger than a predetermined value (for example, ten times or larger). As a result, when it is determined that the counter value is equal to or larger than the predetermined value (S74: YES), the CPU 41 proceeds to S75. Otherwise, when it is determined that the counter value is smaller than the predetermined value (S74: NO), the CPU 41 proceeds to S65 without performing reflection on the vehicle control this time since the number of samples is small.

In S75, the CPU 41 reads the deceleration control start distance Ps1 stored in the vehicle operation history DB 37 and substitutes therein the average Ps1_av of deceleration start points of a predetermined number of times in the past, which is calculated in the above S73. Note that the initial value of the Ps1 is set to a predetermined value in advance. Further, as will be described later, based on the deceleration control start distance Ps1 substituted in the above S75, the vehicle control system 1 starts deceleration control and acceleration control of the vehicle at the deceleration control start distance Ps1 on a near side from the entrance clothoid start point KA.

Next, in S76, the CPU 41 reads the sum Ps1_sum of deceleration start points of a predetermined number of times in the past which is stored in the vehicle operation history DB 37 and resets the value.

Further, in S77, the CPU 41 reads the deceleration start point accumulation counter Cnt1 stored in the RAM 42 and resets the value. Thereafter, the CPU 41 proceeds to S65.

Figure 11:
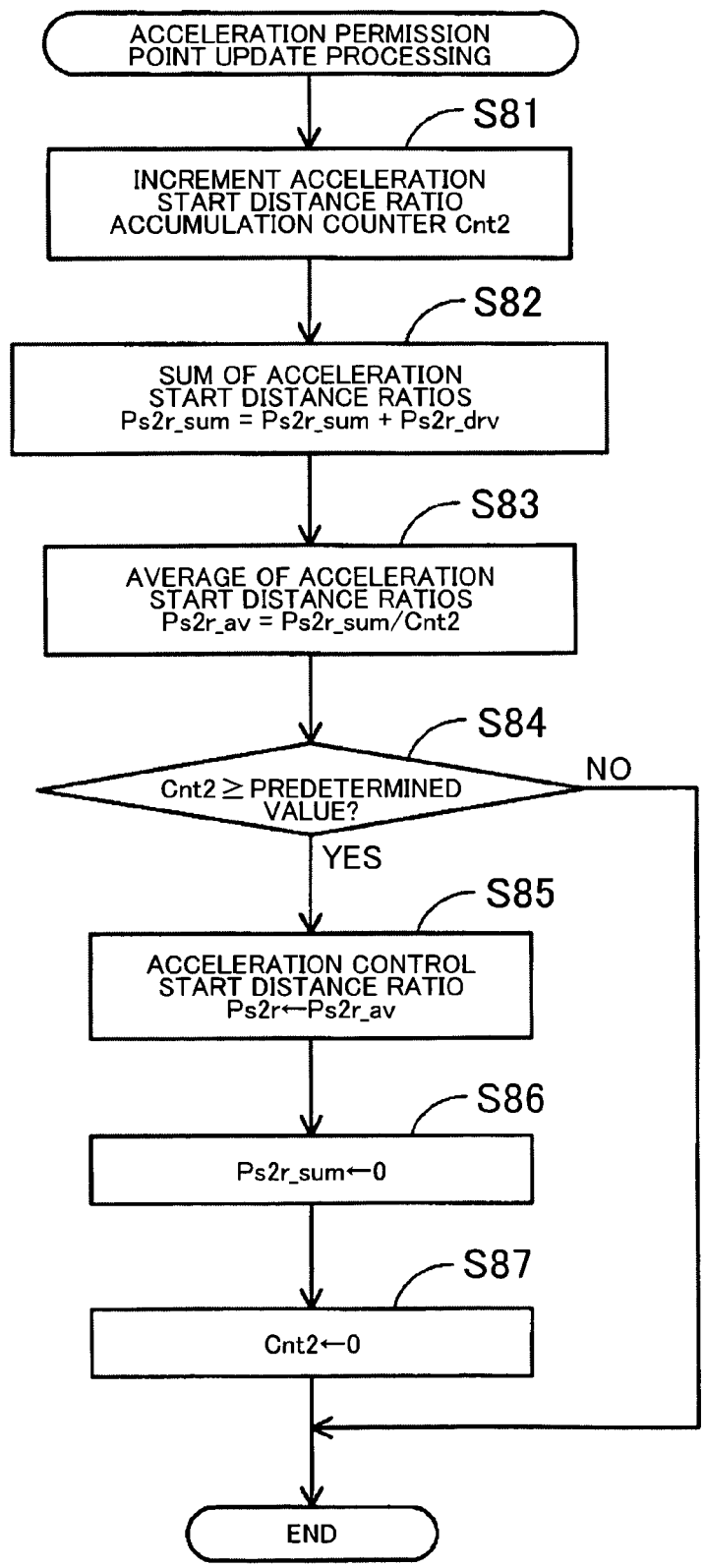
FIG. 11 is a flowchart of a sub-processing program of acceleration permission point update processing executed by the vehicle control system according to this embodiment.

Next, sub-processing of the acceleration permission point update processing in the above S66 will be explained based on FIG. 11. FIG. 11 is a flowchart of a sub-processing program of the acceleration permission point update processing.

First, in S81, the CPU 41 reads and increments an acceleration start distance ratio accumulation counter Cnt2 stored in the RAM 42. Note that the processing through S81 to S87 below is performed for every radius of curvature of a curve on which the vehicle traveled.

Next, in S82, the CPU 41 adds the acceleration start distance ratio Ps2r_drv, which is the timing of the acceleration operation by the driver comprehended in the curve on which the vehicle traveled this time, to a sum Ps2r_sum of acceleration start distance ratios of a predetermined number of times in the past, which is stored in the vehicle operation history DB 37.

Subsequently, in S83, the CPU 41 calculates an average Ps2r_av of acceleration start distance ratios of a predetermined number of times in the past including the timing of the acceleration operation by the driver comprehended in the curve of this time. Note that the above S83 corresponds to processing of the acceleration average calculating unit.

Thereafter, in S84, the CPU 41 reads the acceleration start distance ratio accumulation counter Cnt2 stored in the RAM 42 and determines whether or not the counter value is equal to or larger than a predetermined value (for example, ten times or larger). As a result, when it is determined that the counter value is equal to or larger than the predetermined time (S84: YES), the CPU 41 proceeds to S85. Otherwise, when it is determined that the counter value is smaller than the predetermined value (S84: NO), the CPU 41 proceeds to S67 without performing reflection on the vehicle control this time since the number of samples is small.

In S85, the CPU 41 reads the acceleration control start distance ratio Ps2r stored in the vehicle operation history DB 37 and substitutes therein the average Ps2r_av of acceleration start distance ratios of a predetermined number of times in the past, which is calculated in the above S83. Note that the initial value of Ps2r is set to a predetermined value in advance. Then, the acceleration control start distance ratio Ps2r is stored for every radius of curvature of a curve. Further as will be described later, based on the acceleration control start distance ratio Ps2r substituted in the above S85, the vehicle control system 1 starts acceleration permission control of the vehicle at a point where the vehicle has traveled the distance corresponding to the amount of the acceleration control start distance ratio Ps2r with respect to the constant R section from the constant R start point RS.

Next, in S86, the CPU 41 reads the sum Ps2r_sum of deceleration start points of a predetermined number of times in the past, which is stored in the vehicle operation history DB 37, and resets the value.

Further, in S87, the CPU 41 reads the acceleration start distance ratio accumulation counter Cnt2 stored in the RAM 42 and resets the counter value. Thereafter, the CPU 41 proceeds to S67.

Figure 12:
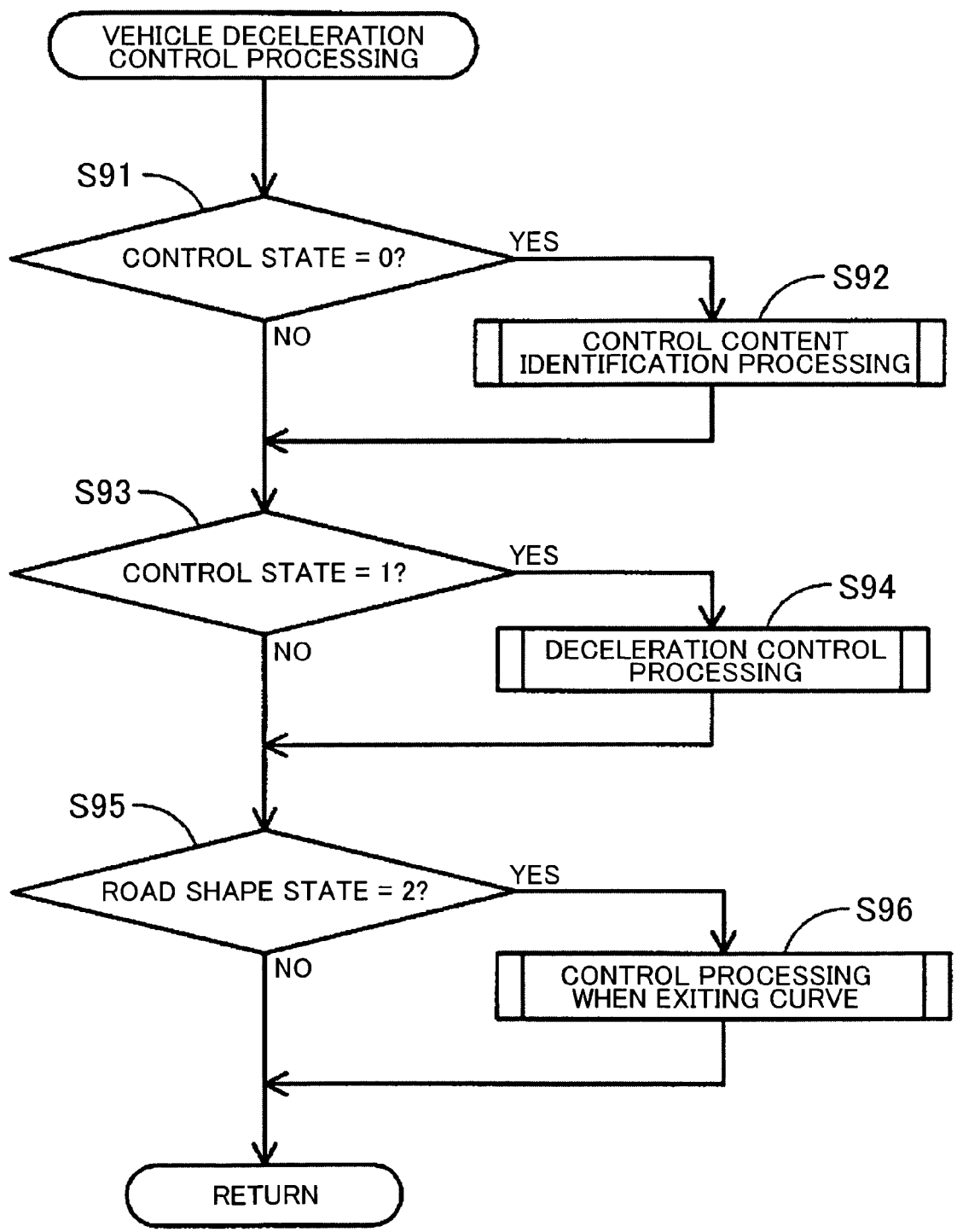
FIG. 12 is a flowchart of a sub-processing program of vehicle deceleration control processing executed by the vehicle control system according to this embodiment.

Next, sub-processing of the vehicle deceleration control processing in the above S7 will be explained based on FIG. 12. FIG. 12 is a flowchart of a sub-processing program of the vehicle deceleration control processing.

First, in S91, the CPU 41 reads the control state stored in the RAM 42 and determines whether the value is "0" or not, that is, whether the vehicle has not identified yet a control implementation content with respect to the curve on which the vehicle is to travel from now. Note that the control state is a status of identifying a control implementation state of the vehicle with respect to a curve. Then the control state is initialized in the above S2, and one of values "1" to "3" is substituted therein in control content identification processing (FIG. 13), deceleration control processing (FIG. 14), and control processing when exiting a curve (FIG. 15), which will be described later.

When it is determined that the control state is "0" as a result of determination in the above S91 (S91: YES), the CPU 41 proceeds to S92. In S92, the CPU 41 executes the control content identification processing (FIG. 13), which will be described later. Note that the control content identification processing is processing to identify the control implementation content with respect to the curve on which the vehicle is to travel from now. Otherwise, when it is determined that the control state is other than "0" as a result of the determination in S91 (S91: NO), the CPU 41 proceeds to S93.

Next, in S93, the CPU 41 reads the control state stored in the RAM 42 and determines whether the value is "1" or not, that is, whether the control implementation content with respect to the curve on which the vehicle is to travel from now is identified or not.

Then, when it is determined that the control state is "1" as a result of determination in the above S93 (S93: YES), the CPU 41 proceeds to S94. In S94, the CPU 41 executes the deceleration control processing (FIG. 14), which will be described later. Note that the deceleration control processing is processing to perform deceleration control (acceleration limit control) of the vehicle before entering the curve, in consideration of driving tendencies of the driver comprehended in the driver tendency comprehension processing (S6). Otherwise, when it is determined that the control state is other than "1" as a result of determination in the above S93 (S93: NO), the CPU 41 proceeds to S95.

Next, in S95, the CPU 41 reads the control state stored in the RAM 42 and determines whether the value is "2" or not, that is, whether the vehicle has implemented deceleration control before entering the curve or not.

Then, when it is determined that the control state is "2" as a result of determination in the above S95 (S95: YES), the CPU 41 proceeds to S96. In S96, the CPU 41 executes the control processing when exiting a curve (FIG. 15), which will be described later. Note that the control processing when exiting a curve is processing to perform acceleration permission control of the vehicle while traveling on a curve, in consideration of driving tendencies of the driver comprehended in the driver tendency comprehension processing (S6). On the other hand, when it is determined that the control state is other than "2" as a result of determination in the above S95 (S 95: NO), the CPU 41 proceeds to S8.

Figure 13:
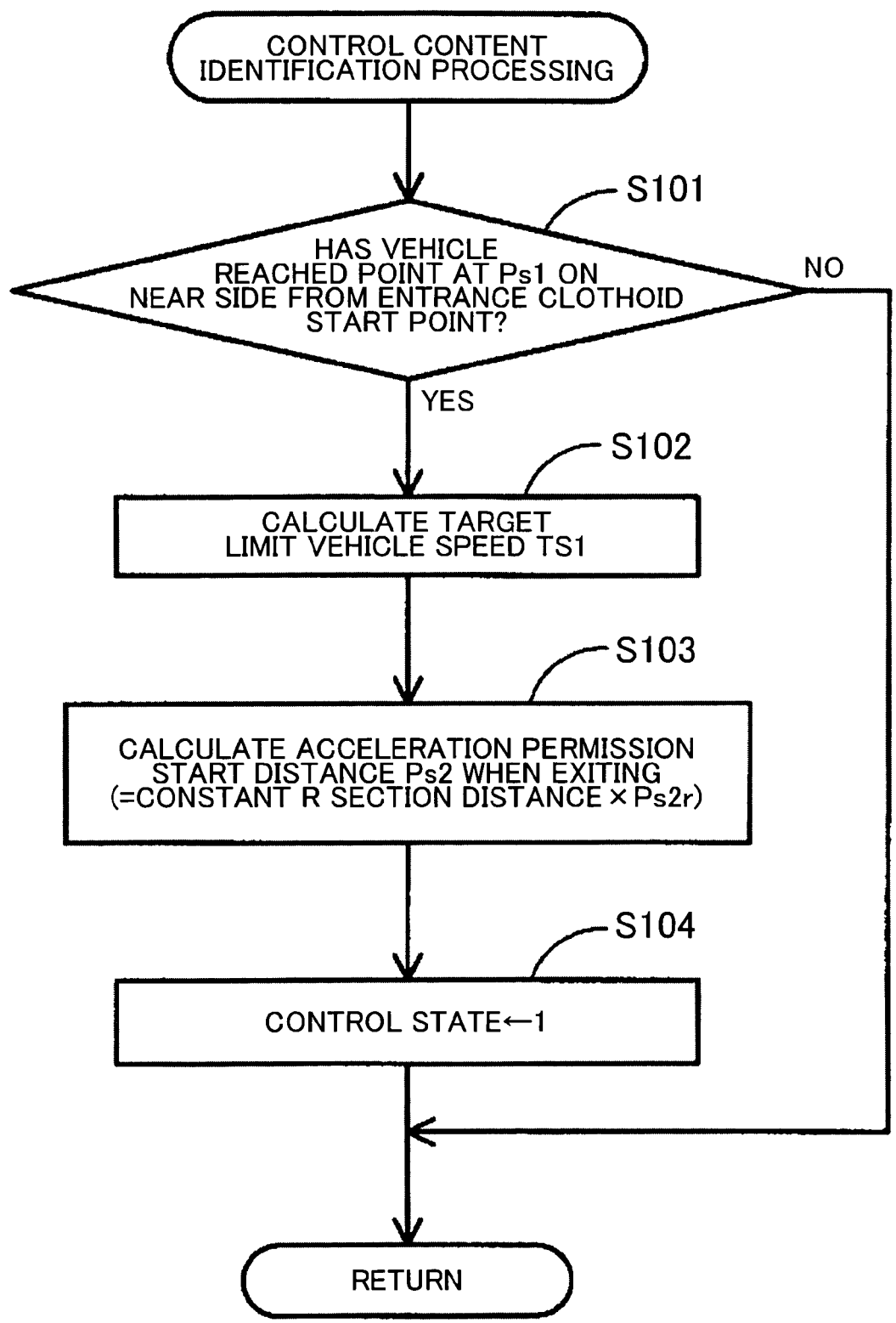
FIG. 13 is a flowchart of a sub-processing program of control content identification processing executed by the vehicle control system according to this embodiment.

Next, sub-processing of the control content identification processing in the above S92 will be explained based on FIG. 13. FIG. 13 is a flowchart of a sub-processing program of the control content identification processing.

First, in S101, the CPU 41 determines whether or not the vehicle has reached a point at the deceleration control start distance Ps1 on a near side from the entrance clothoid start point KA (refer to FIG. 3) based on the current position of the vehicle and the deceleration control start distance Ps1 stored in the vehicle operation history DB 37. Note that the deceleration control start distance Ps1 is calculated from a plurality of timings when the driver started a deceleration operation in the past by the deceleration start point update processing in FIG. 10 as described above.

Then, when it is determined that the vehicle has reached the point at the Ps1 on the near side from the entrance clothoid start point (101: YES), the CPU 41 proceeds to S102. Otherwise, when it is determined that the vehicle has not reached the point at the Ps1 on the near side from the entrance clothoid start point (S101: NO), the CPU 41 proceeds to S93 without identifying the control content and with the control state being "0" since it is not the timing for implementing control.

In S102, the CPU 41 calculates a target limiting vehicle speed TS1 which is an optimum speed when entering the curve ahead.

Here, an example of a calculating method of the target limiting vehicle speed will be explained using FIG. 18. FIG. 18 is a view showing a calculating method of the target limiting vehicle speed TS1 when entering a curve in the vehicle control system 1 according to this embodiment.

In the vehicle control system 1 according to this embodiment, the target limiting vehicle speed is calculated with the radius (R) of a curve and the lateral acceleration (lateral G) due to a centrifugal force which is generated on the vehicle 2 during a curve, as shown in FIG. 18. Then, for the lateral acceleration, when a value is set by the user or the like in advance, the set value is used. When the lateral acceleration is not set, a basic value "0.20 G" is used.

Subsequently, in the S103, first the CPU 41 obtains the radius of curvature of the curve ahead of the vehicle. Then by multiplying the acceleration control start distance ratio Ps2$r$ corresponding to the obtained radius of curvature among the acceleration control start distance ratios Ps2$r$ calculated in the above S85 with the distance of the constant R section of the curve ahead of the vehicle in the traveling direction, the CPU 41 calculates the distance Ps2 corresponding to the amount of the acceleration control start distance ratio Ps2$r$ with respect to the constant R section. Thus, the CPU 41 obtains an acceleration permission timing at which the driver performs an acceleration operation while traveling on the curve of this time. Note that the above S103 corresponds to processing of the acceleration permission timing obtaining unit.

Next, in S104, the CPU 41 reads the control state stored in the RAM 42 and substitutes "1" therein. Thereafter, the CPU 41 proceeds to S93.

Figure 14:
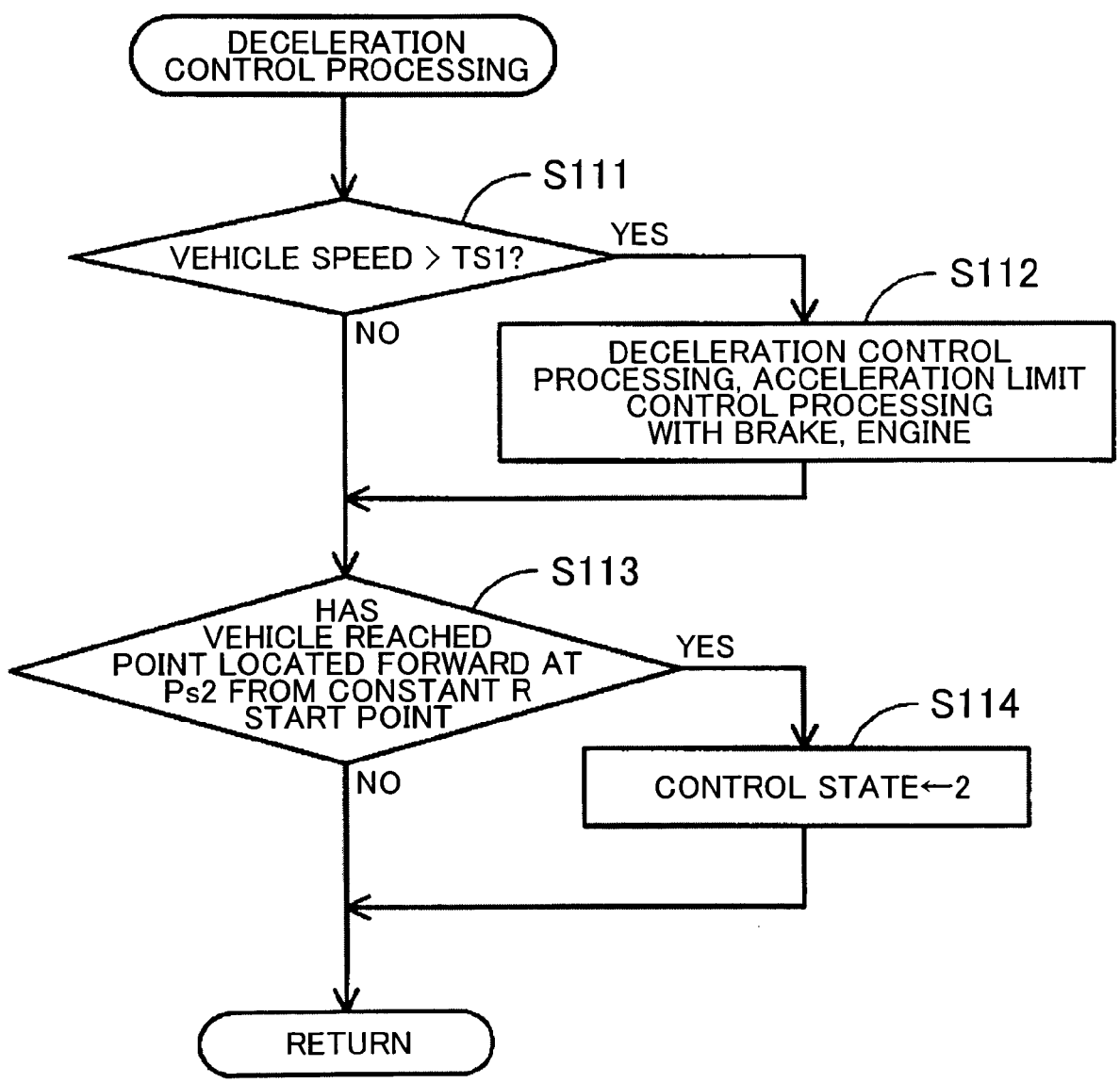
FIG. 14 is a flowchart of a sub-processing program of deceleration control processing executed by the vehicle control system according to this embodiment.

Next, sub-processing of the deceleration control processing in the above S94 will be explained based on FIG. 14. FIG. 14 is a flowchart of a sub-processing program of the deceleration control processing.

First, in S111, the CPU 41 detects the current vehicle speed of the vehicle by the vehicle speed sensor 29, and determines whether or not the current vehicle speed is larger than the target limiting vehicle speed TS1 calculated in the above S102.

Then, when it is determined that the current vehicle speed is larger than the target limiting vehicle speed TS1 (S111: YES), the CPU 41 performs the deceleration control processing with the brakes and the engine. Specifically, first, deceleration is performed by closing the throttle valve of the engine 4 via the engine ECU 7. Thereafter, if the target limiting vehicle speed TS1 is not reached within a predetermined time, deceleration is performed further to the target limiting vehicle speed TS1 by operating the brakes 6A to 6D via the brake ECU 9. Further, deceleration may be performed by shift-down controlling the AT 5. In addition, while performing the deceleration control processing, the CPU 41 also performs acceleration limit control to control so that the acceleration is not performed by constantly keeping the throttle valve in a closed state even when the accelerator pedal 10 is pressed down by the driver. On the other hand, when it is determined that the current vehicle speed is equal to or lower than the target limiting vehicle speed TS1 (S111: NO), the CPU 41 proceeds to S113.

In S113, based on the current position of the vehicle and an acceleration permission start distance Ps2 when exiting stored in the vehicle operation history DB 37, the CPU 41 determines whether or not the vehicle has reached a point located forward at the acceleration permission start distance Ps2 when exiting from the constant R start point RS (refer to FIG. 3). Note that the acceleration permission start distance Ps2 when exiting is calculated from a plurality of timings when the driver started acceleration in the past by the control content identification processing in FIG. 13 as described above.

Then, when it is determined that the vehicle has reached the point located forward at the Ps2 from the constant R start point RS (S113: YES), the CPU 41 proceeds to S114. Otherwise, when it is determined that the vehicle has not reached the point located forward at the Ps2 from the constant R start point RS (S113: NO), the CPU 41 proceeds to S95 with the control state being "1" since it is not the timing to implement the acceleration permission control.

On the other hand, in S114, the CPU 41 reads the control state stored in the RAM 42 and substitutes "2" therein. Thereafter, the CPU 41 proceeds to S95.

Figure 15:
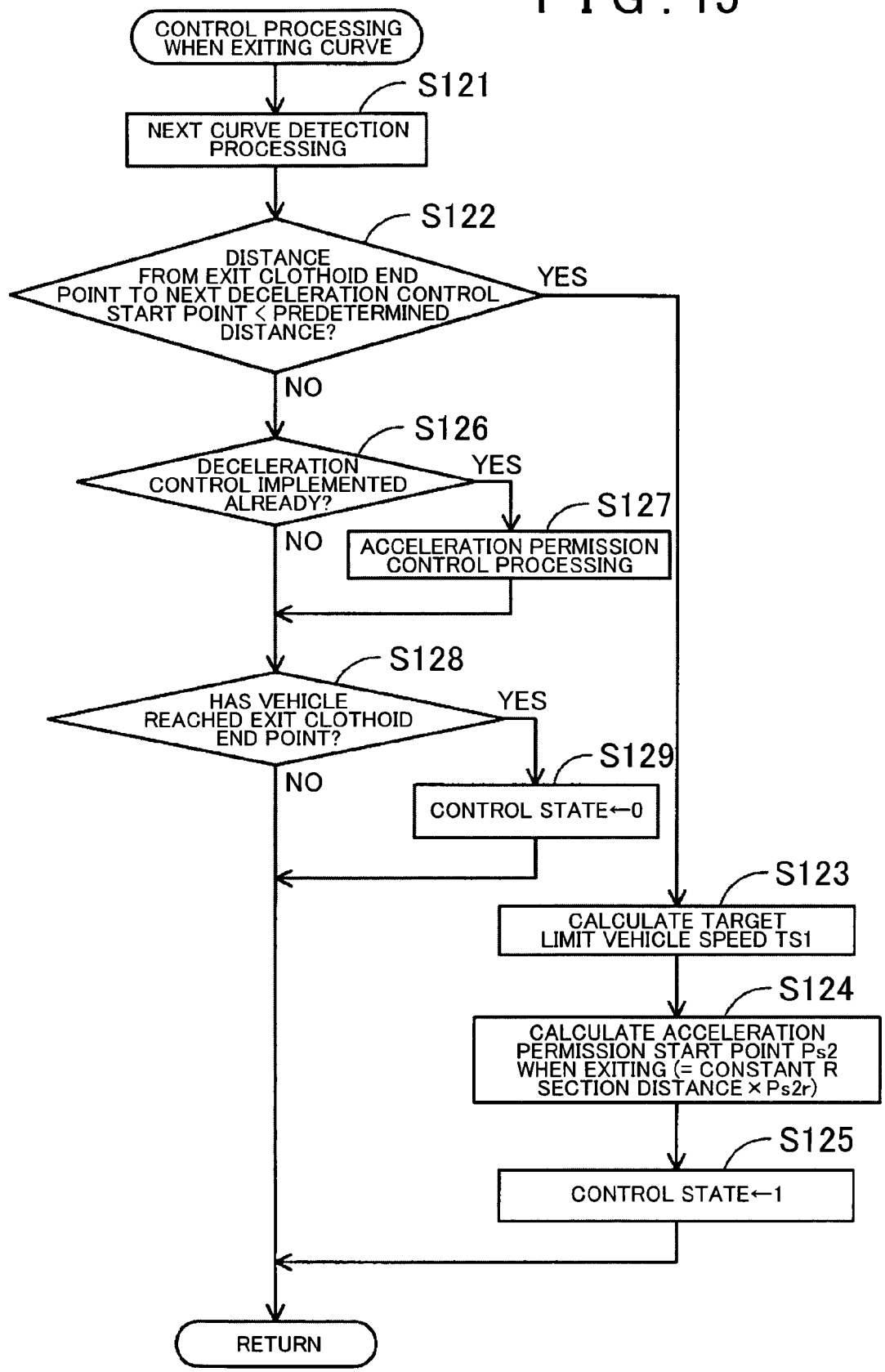
FIG. 15 is a flowchart of a sub-processing program of control processing when exiting a curve executed by the vehicle control system according to this embodiment.

Next, sub-processing of the control processing when exiting a curve in the above S96 will be explained based on FIG. 15. FIG. 15 is a flowchart of a sub-processing program of the control processing when exiting a curve.

First, in S121, based on the current location of the vehicle and the map information stored in the map information DB 36, the CPU 41 detects a curve (hereinafter referred to as a next curve) located ahead of the vehicle in the traveling direction succeeding the curve on which the vehicle is currently traveling.

Next, in S122, the CPU 41 obtains curve information of the next curve detected in the above S121 from the map information DB 36, and determines whether the distance from the exit clothoid end point KE of the curve on which the vehicle is currently traveling to the deceleration control start point of the next curve (that is, the point at the deceleration control start distance Ps1 on a near side from the entrance clothoid start point KA of the next curve) is shorter than a predetermined distance (for example 20 m) or not.

As a result, when it is determined that the distance from the exit clothoid end point KE of the curve on which the vehicle is currently traveling to the deceleration control start point of the next curve is shorter than the predetermined distance (S122: YES), the CPU 41 proceeds to S123 without performing the acceleration permission control even when the acceleration limit control is performed in the above S112. Accordingly, limiting of acceleration is performed continuously during a period until traveling on the next curve. On the other hand, when it is determined that the distance from the exit clothoid end point KE of the curve on which the vehicle is currently traveling to the deceleration control start point of the next curve is equal to or longer than the predetermined distance (S122: NO), the CPU 41 proceeds to S126. Note that the above S122 corresponds to processing of the distance determining unit.

In S123, the CPU 41 calculates the target limiting vehicle speed TS1 that is an optimum vehicle speed when entering the curve ahead. Note that the calculation method of the target limiting vehicle speed TS1 is the same as the processing in the above S102, and hence the explanation thereof is omitted.

Subsequently, in S124, the CPU 41 calculates the distance corresponding to the amount of the acceleration control start distance ratio Ps2$r$ with respect to the constant R period of the next curve by multiplying the acceleration control start distance ratio Ps2$r$ calculated in the above S85 with the distance of the constant R section of the next curve. Thus, the CPU 41 identifies the timing to perform the acceleration control in the next curve.

Next, in S125, the CPU 41 reads the control state stored in the RAM 42 and substitutes the value "1" therein. Thereafter, the CPU 41 proceeds to S8.

On the other hand, in S126, the CPU 41 determines whether the acceleration control of the vehicle (that is, acceleration limit control) is performed in the above S112 or not. As a result, when it is determined that the deceleration control is already performed (S126: YES), the acceleration permission control is performed to release the acceleration limit implemented in the above S112 via the engine ECU 7. Accordingly, it becomes possible to accelerate the vehicle according to pressing down of the accelerator pedal 10. Otherwise, when it is determined that the deceleration control is not implemented (S126: NO), the CPU 41 proceeds to S128 without performing the processing to release the acceleration limit since the acceleration limit is not performed from the beginning.

In S128, the CPU 41 determines whether the vehicle has reached the exit clothoid end point KE or not based on the current position of the vehicle and the curve information obtained in the above S5.

Then, when it is determined that the vehicle has reached the exit clothoid end point KE (S128: YES), the CPU 41 proceeds to S129. Otherwise, when it is determined that the vehicle has not reached the exit clothoid end point KE (S128: NO), the CPU 41 proceeds to S8.

In S129, the CPU 41 reads the control state stored in the RAM 42 and substitutes "0" therein. Thereafter, the CPU 41 proceeds to S8.

As explained in detail above, in the vehicle control system 1 according to this embodiment, a vehicle control method with the vehicle control system 1, and a computer program executed in the vehicle control system 1, a deceleration start point where the driver performs a deceleration operation of the vehicle before entering a curve is identified from the vehicle operation history in the past when the vehicle is to travel on a curve (S75), and an acceleration start point where the driver performs an acceleration operation of the vehicle when exiting a curve is identified from the vehicle operation history in the past (S85). While these items are comprehended as driving tendencies of the driver, the deceleration control and the acceleration limit control to a target limiting vehicle speed are performed when the vehicle reaches the deceleration start point (S112). Thereafter, when the vehicle reaches the acceleration start point, the acceleration permission control to release the acceleration limit is performed (S127). Therefore, it becomes possible to comprehend driving tendencies from the vehicle operation history of the driver in the past, and perform appropriate control of the vehicle in which driving tendencies of the driver are reflected on the control content. Particularly, when exiting a curve, permission control of acceleration of the vehicle can be performed at timing when the driver performs an acceleration operation, thereby allowing the driver to drive without getting stressed.

Further, the average of timings when the driver performs an acceleration operation while traveling on a curve is predicted as a timing when the driver performs an acceleration operation from the vehicle operation history of the driver in the past (S83, S85), and thus driving tendencies of the driver while traveling on a curve can be comprehended more precisely.

Further, a vehicle operation history of traveling on a curve that is not suitable for determining driving tendencies of the driver, such as a curve with a radius of curvature that is too large, a curve with the length of a curve section that is too short, or the like, is excluded from comprehension targets of driving tendencies of the driver (S32, S33). Therefore, driving tendencies of the driver while traveling on a curve can be comprehended more precisely when exiting a curve.

Further, a vehicle operation history that is not suitable for determining driving tendencies of the driver when the ESC operates is excluded from comprehension targets of driving tendencies of the driver (S62). Therefore, driving tendencies of the driver while traveling on a curve can be comprehended more precisely.

Furthermore, when the distance from an end point of a curve on which the vehicle is currently traveling to a point to limit acceleration that is set before the next curve ahead of the vehicle in the traveling direction is within a predetermined distance, the control to permit acceleration of the vehicle is not performed even when reaching the timing of permitting acceleration (S122). Thus, when traveling through consecutive curves, it is possible to prevent that an acceleration limit is performed again just after an acceleration limit on the vehicle is released. Therefore, behavior of the vehicle can be stabilized, and it would not give the driver a feeling of discomfort due to continuous control of the vehicle.

It should be noted that the present invention is not limited to the above embodiment, and of course various modifications and variations can be made without departing from the spirit of the present invention.

For example, in this embodiment, when comprehending driving tendencies of the driver, a timing when the driver performs a deceleration operation and a timing when the driver performs an acceleration operation are identified on the basis of distance ratio with respect to the entrance clothoid start point KA and the constant R section, but they may be identified by time. For example, it is possible to identify by "after a predetermined time period after passing an entrance clothoid start point KA".

Further, a lateral G generated on the vehicle body while traveling on a curve may be detected by the G sensor 30, and braking control may be performed when the detected lateral G exceeds a reference value.

Further, in this embodiment, at the time when reaching an acceleration permission timing, the acceleration limit on the vehicle which has been performed up to this point is released completely, and acceleration control according to an operation of the accelerator pedal 10 by the driver is performed. However, it may be controlled such that the acceleration limit is released gradually from the time when reaching an acceleration permission timing. Specifically, the maximum opening amount of the throttle valve may be changed step by step at every predetermined time.

Further, in this embodiment, the vehicle control processing program shown in FIG. 4 to FIG. 15 is executed by the navigation ECU 23 provided in the navigation device 3, but it may be executed by the engine ECU 7, the AT ECU 8, the brake ECU 9, or the like. Further, the processing may be shared by a plurality of ECUs.

What is claimed is:

1. A vehicle control system, comprising:
   a curve detecting unit which detects a curve located ahead of a vehicle in a traveling direction;
   a vehicle control unit which performs control of the vehicle traveling on the curve detected by the curve detecting unit; and
   an acceleration permission timing obtaining unit which obtains, based on a vehicle operation history of a driver driving the vehicle, an acceleration permission timing which is a timing when the driver performs an acceleration operation while traveling on a curve, wherein
   the vehicle control unit performs control of limiting acceleration of the vehicle before entering a curve and permitting acceleration of the vehicle at the acceleration permission timing obtained by the acceleration permission timing obtaining unit.

2. The vehicle control system according to claim 1, wherein
   the acceleration permission timing obtaining unit comprising:
   an acceleration timing storing unit which stores a plurality of timings when the driver driving the vehicle performed an acceleration operation while traveling on a curve in the past; and
   an acceleration average calculating unit which calculates an average of the plurality of timings stored in the acceleration timing storing unit, wherein
   the average calculated by the acceleration average calculating unit is obtained as the acceleration permission timing.

3. The vehicle control system according to claim 2, further comprising
   a curve shape obtaining unit which obtains a shape of a curve ahead of the vehicle in the traveling direction, wherein
   the acceleration timing storing unit stores a timing when an acceleration operation is performed while traveling on a curve having a predetermined radius of curvature or smaller and having a predetermined length or longer.

4. The vehicle control system according to claim 3, further comprising
   an operation detecting unit which detects operation of a side slip prevention device of the vehicle, wherein
   the acceleration average calculating unit calculates an average excluding a timing stored while traveling on a curve on which operation of the side slip prevention device of the vehicle is detected by the operation detecting unit.

5. The vehicle control system according to claim 4, further comprising
   a distance determining unit which determines whether a distance from an end point of the curve on which the vehicle is currently traveling to a point to limit acceleration which is set before a next curve located ahead of the vehicle in the traveling direction is within a predetermined distance or not when the acceleration permission timing obtained by the acceleration permission timing obtaining unit is reached, wherein
   the vehicle control unit does not perform control to permit acceleration of the vehicle when the distance determining unit determines that the distance from the end point of the curve to the point to limit acceleration of the next curve is within the predetermined distance.

6. The vehicle control system according to claim 1, further comprising
   a distance determining unit which determines whether a distance from an end point of the curve on which the vehicle is currently traveling to a point to limit acceleration which is set before a next curve located ahead of the vehicle in the traveling direction is within a predetermined distance or not when the acceleration permission timing obtained by the acceleration permission timing obtaining unit is reached, wherein
   the vehicle control unit does not perform control to permit acceleration of the vehicle when the distance determining unit determines that the distance from the end point of the curve to the point to limit acceleration of the next curve is within the predetermined distance.

7. The vehicle control system according to claim 2, further comprising
an operation detecting unit which detects operation of a side slip prevention device of the vehicle, wherein
the acceleration average calculating unit calculates an average excluding a timing stored while traveling on a curve on which operation of the side slip prevention device of the vehicle is detected by the operation detecting unit.

8. The vehicle control system according to claim 7, further comprising
a distance determining unit which determines whether a distance from an end point of the curve on which the vehicle is currently traveling to a point to limit acceleration which is set before a next curve located ahead of the vehicle in the traveling direction is within a predetermined distance or not when the acceleration permission timing obtained by the acceleration permission timing obtaining unit is reached, wherein
the vehicle control unit does not perform control to permit acceleration of the vehicle when the distance determining unit determines that the distance from the end point of the curve to the point to limit acceleration of the next curve is within the predetermined distance.

9. The vehicle control system according to claim 2, further comprising
a distance determining unit which determines whether a distance from an end point of the curve on which the vehicle is currently traveling to a point to limit acceleration which is set before a next curve located ahead of the vehicle in the traveling direction is within a predetermined distance or not when the acceleration permission timing obtained by the acceleration permission timing obtaining unit is reached, wherein
the vehicle control unit does not perform control to permit acceleration of the vehicle when the distance determining unit determines that the distance from the end point of the curve to the point to limit acceleration of the next curve is within the predetermined distance.

10. The vehicle control system according to claim 3, further comprising
a distance determining unit which determines whether a distance from an end point of the curve on which the vehicle is currently traveling to a point to limit acceleration which is set before a next curve located ahead of the vehicle in the traveling direction is within a predetermined distance or not when the acceleration permission timing obtained by the acceleration permission timing obtaining unit is reached, wherein
the vehicle control unit does not perform control to permit acceleration of the vehicle when the distance determining unit determines that the distance from the end point of the curve to the point to limit acceleration of the next curve is within the predetermined distance.

11. A vehicle control method, comprising the steps of:
detecting a curve located ahead of a vehicle in a traveling direction;
obtaining, based on a vehicle operation history of a driver driving the vehicle, an acceleration permission timing which is a timing when the driver performs an acceleration operation while traveling on a curve; and
performing control of limiting acceleration of the vehicle before entering a curve and permitting acceleration of the vehicle at the acceleration permission timing obtained by the acceleration permission timing obtaining step.

12. A non-transitory computer program mounted in a computer, the non-transitory computer program causing the computer to execute the functions of:
detecting a curve located ahead of a vehicle in a traveling direction;
obtaining, based on a vehicle operation history of a driver driving the vehicle, an acceleration permission timing which is a timing when the driver performs an acceleration operation while traveling on a curve; and
performing control of limiting acceleration of the vehicle before entering a curve and permitting acceleration of the vehicle at the acceleration permission timing obtained by the acceleration permission timing obtaining function.

* * * * *